US012338670B2

(12) United States Patent
Abrahamsson et al.

(10) Patent No.: US 12,338,670 B2
(45) Date of Patent: Jun. 24, 2025

(54) OVERHEAD DOOR OPERATOR SYSTEM

(71) Applicant: Assa Abloy Entrance Systems AB, Landskrona (SE)

(72) Inventors: Magnus Abrahamsson, Loddekopinge (SE); Anton Hansson, Kivik (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 17/928,981

(22) PCT Filed: Jun. 17, 2021

(86) PCT No.: PCT/EP2021/066339
§ 371 (c)(1),
(2) Date: Dec. 1, 2022

(87) PCT Pub. No.: WO2021/255139
PCT Pub. Date: Dec. 23, 2021

(65) Prior Publication Data

US 2023/0220715 A1 Jul. 13, 2023

(30) Foreign Application Priority Data

Jun. 17, 2020 (SE) .................................... 2030200-6

(51) Int. Cl.
*E05F 15/41* (2015.01)
*E05F 15/67* (2015.01)

(52) U.S. Cl.
CPC .............. *E05F 15/41* (2015.01); *E05F 15/67* (2015.01); *E05Y 2201/408* (2013.01); (Continued)

(58) Field of Classification Search
CPC . E05F 15/67; E05F 15/41; E05F 15/43; E05F 15/40; E05Y 2400/41; E05Y 2400/32
See application file for complete search history.

(56) References Cited

U.S. PATENT DOCUMENTS 4,732,203 A * 3/1988 Alten ...................... E05F 15/67 160/188
5,412,297 A * 5/1995 Clark ...................... E05F 15/42 49/27

(Continued)

FOREIGN PATENT DOCUMENTS

DE 3806733 9/1989
DE 10261083 3/2004
WO 2019175573 9/2019

OTHER PUBLICATIONS

International Search Report and Written Opinion in PCT/EP2021/066339, mailed Sep. 24, 2021.
Swedish Search Report in 2030200-6, mailed Dec. 18, 2020.

*Primary Examiner* — Janet M Wilkens
*Assistant Examiner* — Susan M. Heschel
(74) *Attorney, Agent, or Firm* — Wissing Miller LLP

(57) ABSTRACT

The disclosure relates to an overhead door operator system and to a method for controlling such a system. The overhead door operator system opens and closes an opening. The system includes a first frame section (4) at a first side (7) of the opening (2) and a second frame section (6) at a second side (5) of the opening (2). A door (8) is movably connected to the door frame (3). A drive unit (10) is mounted on the door (8). An elongated transmission member (19) extends along the first side (7) of the opening (2) and the first frame section (4). The drive unit (10) includes a driven transmission member (18) in driving connection with the motor (11) and the elongated transmission member. The method comprises the steps of: detecting door movement; determining if detected door movement relates to unexpected door movement; and, if so, taking action so as to prevent more extensive damages.

20 Claims, 11 Drawing Sheets

(52) U.S. Cl.
CPC ... *E05Y 2201/434* (2013.01); *E05Y 2201/684* (2013.01); *E05Y 2201/716* (2013.01); *E05Y 2201/724* (2013.01); *E05Y 2400/302* (2013.01); *E05Y 2400/36* (2013.01); *E05Y 2400/40* (2013.01); *E05Y 2400/44* (2013.01); *E05Y 2400/52* (2013.01); *E05Y 2600/46* (2013.01); *E05Y 2900/106* (2013.01)

(56) References Cited

U.S. PATENT DOCUMENTS

| | | | | |
|---|---|---|---|---|
| 5,557,887 | A * | 9/1996 | Fellows | E05F 15/668 318/807 |
| 5,711,112 | A * | 1/1998 | Barten | E05F 15/643 49/118 |
| 7,061,197 | B1 * | 6/2006 | Mullet | E05F 15/41 318/471 |
| 8,458,956 | B2 * | 6/2013 | Hoermann | E05F 15/668 49/199 |
| 9,234,377 | B2 * | 1/2016 | Schatz | F16H 19/02 |
| 10,053,901 | B2 * | 8/2018 | Schweiss | E05D 13/1207 |
| 10,294,708 | B2 * | 5/2019 | Quaiser | E05F 15/668 |
| 2004/0182528 | A1 | 9/2004 | Rieder | |
| 2008/0036409 | A1 | 2/2008 | Schaefer | |
| 2013/0112357 | A1 * | 5/2013 | Gontarski | E06B 9/13 160/311 |
| 2018/0119476 | A1 * | 5/2018 | Quaiser | E05F 15/632 |

* cited by examiner

OVERHEAD DOOR OPERATOR SYSTEM

This application is a 371 of PCT/EP2021/066339, filed on Jun. 17, 2021, published on Dec. 23, 2021 under publication number WO 2021/255139, which claims priority benefits from Swedish Patent Application No. 2030200-6, filed on Jun. 17, 2020, the disclosure of which is incorporated herein by reference.

TECHNOLOGY FIELD

The present invention relates to a method at a control device for controlling an overhead door operator system for opening and closing an opening. The present invention also relates to an overhead door operator system for opening and closing an opening.

BACKGROUND

A door operator system for an overhead door typically comprises a door connected to a door frame and a drive unit arranged to move the door along the door frame between an open and closed position for opening and closing the opening. The door, which may be a sectional door, is typically used as a garage doors or as an industrial door. The drive unit can further comprise a motor to move the door.

In conventional overhead sectional door an electric motor mounted above the door pulls up the door using wires attached to the door. Such an overhead sectional door often implements balancing springs to reduce the force required to open the door, which increases complexity and is cumbersome to install. Should there be a damage such as a broken wire on such a conventional overhead sectional door, mechanical devices are used to stop the door from falling.

To achieve a more efficient door operator system that reduces the complexity and the risks of the door operator system during operation, maintenance and installation, a door operator system with drive units mounted to the door has been developed. The door is driven by means of driven pinions interfacing with a fixed rack extending along the intended movement trajectory of the door. Such a door addresses several shortcomings and disadvantages with conventional door operator systems by introducing a drive modularity, which allows for easier and faster installation and a reduced complexity. Additionally, it does not require a balancing spring.

The fixed rack requires a high accuracy in manufacturing and proper aligning of the racks when the door is installed. This increases the cost both for the door itself and the installation of the door.

In order to obtain high accuracy and proper aligning of the racks, a chain drive may be implemented. In such a system, driven sprockets on the door may interface with chains extending next to the door.

There is however a need for an overhead door operator system which facilitates avoiding extensive damages associated with door operation.

SUMMARY

An object of the present disclosure is to mitigate, alleviate, or eliminate one or more of the above-identified deficiencies in the art and disadvantages singly or in any combination.

An object of the present disclosure is to provide a method at a control device for controlling an overhead door operator system for opening and closing an opening which facilitates mitigating, alleviating, or eliminating extensive damages associated with the overhead door operator system.

An object of the present disclosure is to provide an overhead door operator system which facilitates mitigating, alleviating, or eliminating extensive damages associated with the overhead door operator system.

According to a first aspect there is provided a method at a control device for controlling an overhead door operator system. The overhead door operator system is configured for opening and closing an opening. The overhead door operator system comprises: a door frame comprising a first frame section at a first side of the opening and a second frame section at a second side of the opening opposite the first side. The overhead door operator system further comprises a door arranged to be moved between an open and closed position, the door being movably connected to the door frame. The overhead door operator system also comprises a drive unit mounted on the door, the drive unit comprising at least one motor arranged to move the door from the closed position to the open position; and a first elongated transmission member extending along the first side of the opening and the first frame section. The drive unit further comprises a first driven transmission member in driving connection with the motor, the first driven transmission member being movably connected to the first elongated transmission member and arranged to interplay with said first elongated transmission member for driving the first driven transmission member along said first elongated transmission member by means of the first elongated transmission member so as to move the door between the closed and open position. The method comprises the steps of: receiving one or more signals from detection associated with movement of the door; based on the received signals, determining whether or not the thus detected door movement is related to an unexpected door movement; and if it is determined that detected door movement is related to an unexpected door movement, taking action so as to prevent more extensive damages. By thus utilizing detection information from detection of door movement, unexpected door movement may be easily and efficiently determined, and extensive damages associated with the overhead door operator system may be mitigated, alleviated or eliminated in an easy and efficient way.

According to an aspect of the method, the step of taking action comprises activating a brake function for preventing uncontrolled movement of the door. By thus activating a brake function based on determined unexpected door movement, more extensive damages associated with the overhead door operator system may be efficiently prevented.

According to an aspect of the method, the drive unit comprises at least one brake member, wherein the step of activating a brake function for preventing uncontrolled movement of the door comprises providing a brake force by means of the at least one brake member against the first side and/or the second side so as to prevent movement of the door. By thus providing a brake force by means of at least one brake member based on determined unexpected door movement against first and/or second side, more extensive damages associated with the overhead door operator system may be efficiently prevented.

According to an aspect of the method, the step of taking action comprises preventing operation of the door operator system associated with opening and closing the opening. By thus preventing operation of the door operator system associated with opening and closing the opening based on determined unexpected door movement, more extensive damages associated with the overhead door operator system may be efficiently prevented. This may e.g. prevent initiation of operation of the door operator system if there has been an impact on the door caused e.g. by a vehicle.

According to an aspect of the method, the step of receiving one or more signals from detection associated with movement of the door comprises receiving acceleration signals and/or vibration signals from detection of movement of the door. By thus utilizing acceleration detection information from acceleration detection of door movement, unexpected door movement may be accurately determined in an easy and efficient way.

According to an aspect of the method, the step of receiving one or more signals from detection associated with movement of the door comprises receiving torque signals from detection of torque of the at least one motor of the door. By thus utilizing detection information from detection of torque of the at least one motor of the door, unexpected door movement may be efficiently determined.

According to an aspect of the method, the drive unit further comprises a second elongated transmission member extending along the second side of the opening and the second frame section, whereby the drive unit further comprises a second driven transmission member arranged to interplay with the second elongated transmission member by means of the second elongated transmission member, the drive unit comprising a motor being in driving connection with the second driven transmission member. The step of receiving one or more signals from detection associated with movement of the door comprises: receiving one or more signals from detection associated with movement of the door in connection to the first side and one or more signals from detection associated with movement of the door in connection to the second side. The step of determining whether or not the thus detected door movement is related to an unexpected door movement comprises: comparing the signals associated with door movement in connection to the first side with the signals associated with door movement in connection the second side; and, determining that the thus detected door movement is related to an unexpected door movement if the difference of door movement in connection to the first side compared with door movement in connection the second side exceeds a certain threshold. Hereby damage such as a broken elongated transmission member on one side may be efficiently and accurately determined, further facilitating preventing more extensive damages by taking action.

According to an aspect of the method, the drive unit comprises a first motor being in driving connection with the first driven transmission member and a second motor being in driving connection with the second driven transmission member, wherein the step of activating a brake function for preventing uncontrolled movement of the door comprises braking by means of the motor being in driving connection with the driven transmission member for which elongated transmission member and driven transmission member are still functioning. Hereby provision of brake function may be easily and efficiently obtained in that a brake member associated with the motor in driving connection with the driven transmission member for which elongated transmission member and driven transmission member are still functioning may be utilized. Hereby a first brake member may be arranged in connection to the first motor, e.g. at the motor shaft of the first motor, and second brake member may be arranged in connection to the second motor, e.g. at the motor shaft of the first motor. Such a brake member may be activated to provide a brake force, e.g. against that elongated transmission member and/or driven transmission member, when energy is no longer provided to that motor.

According to an aspect of the method, the step of receiving one or more signals from detection associated with movement of the door comprises: receiving one or more signals from detection associated with opening and closing movement of the door during normal operation; and, storing information from the detection associated with opening and closing movement of the door during normal operation. The step of determining whether or not the thus detected door movement is related to an unexpected door movement comprises: comparing the signals associated with door movement with the thus stored information from the detection associated with opening and closing movement of the door during normal operation; and, determining that the thus detected door movement is related to an unexpected door movement if the difference between detected door movement compared with the thus stored information of door movement during normal operation exceeds a certain threshold. Normal operation herein refers to operation of the overhead door operator system involving problem free opening and closing, i.e. raising and lowering, of the door. The method may comprise a step of determining whether or not detection associated with opening and closing movement refers to a normal and thus problem free opening and closing. This may be obtained by determining an average value a certain number of cycles back, which would detect sudden changes but not a gradual wear. By thus comparing stored information about opening and closing movement of the door during normal operation with door movement, unexpected door movement may be accurately determined in an easy and efficient way. According to an aspect of the present disclosure, stored information of unexpected door movement is compared with door movement, wherein it is determined that the door movement is related to unexpected door movement if the detected door movement essentially corresponds to thus stored unexpected door movement. Hereby unexpected door movement may be accurately determined in an easy and efficient way.

According to an aspect of the method, the step of determining whether or not the thus detected door movement is related to an unexpected door movement comprises: comparing the signals associated with door movement with stored information about unexpected door movement; and, determining that the thus detected door movement is related to an unexpected door movement if the detected door movement essentially corresponds with thus stored information of unexpected door movement.

According to an aspect of the method, the stored information about unexpected door movement comprises information about different types of unexpected door movements and probable cause for the respective type, wherein the step of determining that the thus detected door movement is related to an unexpected door movement if the detected door movement essentially corresponds with thus stored information of unexpected door movement comprises determining type of the determined unexpected door movement and thereby probable cause for the unexpected door movement.

According to an aspect of the present disclosure the method may comprise the step of filtering received false signals. Such false signals may be related to noise in electronics, small movement of the door which are not related to unexpected door movement requiring action to be taken.

According to a second aspect there is provided an overhead door operator system for opening and closing an opening. The overhead door operator system comprises a control device for controlling the overhead door operator system, the overhead door operator system comprising: a door frame comprising a first frame section at a first side of the opening and a second frame section at a second side of the opening opposite the first side. The overhead door operator system further comprises a door arranged to be moved between an open and closed position, the door being movably connected to the door frame. The overhead door operator system also comprises a drive unit mounted on the door, the drive unit comprising at least one motor arranged to move the door from the closed position to the open position; and a first elongated transmission member extending along the first side of the opening and the first frame section. The drive unit further comprises a first driven transmission member in driving connection with the motor, the first driven transmission member being movably connected to the first elongated transmission member and arranged to interplay with said first elongated transmission member for driving the first driven transmission member along said first elongated transmission member by means of the first elongated transmission member so as to move the door between the closed and open position. The control device is configured to: receive one or more signals from detection associated with movement of the door; based on the received signals, determine whether or not the thus detected door movement is related to an unexpected door movement; and, if it is determined that detected door movement is related to an unexpected door movement, take action so as to prevent more extensive damages.

According to an aspect of the overhead door operator system, the control device is configured to activate a brake function for preventing uncontrolled movement of the door.

According to an aspect of the overhead door operator system, the drive unit comprises at least one brake member, wherein the control device, when activating a brake function for preventing uncontrolled movement of the door, is configured to activate the at least one brake member so as to provide a brake force by means of the at last one brake member against the first side and/or the second side so as to prevent movement of the door.

According to an aspect of the overhead door operator system, the control device, when taking action, is configured to prevent operation of the door operator system associated with opening and closing the opening.

According to an aspect of the overhead door operator system, the control device, when receiving one or more signals from detection associated with movement of the door, is configured to receive acceleration signals and/or vibration signals from detection of movement of the door by means of one or more movement sensors arranged in connection to the door. The one or more movement sensors may comprise one or more acceleration sensors such as accelerometer and/or one or more vibration sensors such as quicksilver sensor or the like, arranged in connection to the door.

According to an aspect of the overhead door operator system, the control device, when receiving one or more signals from detection associated with movement of the door, is configured to receive torque signals from detection of torque of the at least one motor of the door by means of torque sensor arranged in connection to the at least one motor.

According to an aspect of the overhead door operator system, the drive unit further comprises a second elongated transmission member extending along the second side of the opening and the second frame section, whereby the drive unit further comprises a second driven transmission member arranged to interplay with the second elongated transmission member by means of the second elongated transmission member, the drive unit comprising a motor being in driving connection with the second driven transmission member. The control device, when receiving one or more signals from detection associated with movement of the door, is configured to: receive one or more signals from detection associated with movement of the door in connection to the first side and one or more signals from detection associated with movement of the door in connection to the second side. The control device, when determining whether or not the thus detected door movement is related to an unexpected door movement, is configured to: compare the signals associated with door movement in connection to the first side with the signals associated with door movement in connection the second side; and, determine that the thus detected door movement is related to an unexpected door movement if the difference of door movement in connection to the first side compared with door movement in connection the second side exceeds a certain threshold.

According to an aspect of the overhead door operator system, the drive unit comprises a first motor being in driving connection with the first driven transmission member and a second motor being in driving connection with the second driven transmission member, wherein the control device, when activating a brake function for preventing uncontrolled movement of the door is configured to activate a braking function of the motor being in driving connection with the driven transmission member for which elongated transmission member and driven transmission member are still functioning.

According to an aspect of the overhead door operator system, the control device, when receiving one or more signals from detection associated with movement of the door, is configured to: receive one or more signals from detection associated with opening and closing movement of the door during normal operation; and, store information from the detection associated with opening and closing movement of the door during normal operation. The control device, when determining whether or not the thus detected door movement is related to an unexpected door movement, is configured to: compare the signals associated with door movement with the thus stored information from the detection associated with opening and closing movement of the door during normal operation; and, determine that the thus detected door movement is related to an unexpected door movement if the difference between detected door movement compared with the thus stored information of door movement during normal operation exceeds a certain threshold. Normal operation herein refers to operation of the overhead door operator system involving problem free opening and closing, i.e. raising and lowering, of the door. The may be configured to determine whether or not detection associated with opening and closing movement refers to a normal and thus problem free opening and closing. This may be obtained by determining an average value a certain number of cycles back, which would detect sudden changes but not a gradual wear.

According to an aspect of the overhead door operator system, the control device, when determining whether or not the thus detected door movement is related to an unexpected door movement, is configured to: compare the signals associated with door movement with stored information about unexpected door movement; and, determine that the thus detected door movement is related to an unexpected door movement if the detected door movement essentially corresponds with thus stored information of unexpected door movement.

According to an aspect of the overhead door operator system, the stored information about unexpected door movement comprises information about different types of unexpected door movements and probable cause for the respective type, wherein the control device (100), when determining that the thus detected door movement is related to an unexpected door movement if the detected door movement essentially corresponds with thus stored information of unexpected door movement, is configured to determine type of the determined unexpected door movement and thereby probable cause for the unexpected door movement.

According to an aspect of the present disclosure the control device of the overhead door operator system may be configured to filter received false signals. Such false signals may be related to noise in electronics, small movement of the door which are not related to unexpected door movement requiring action to be taken.

The overhead door operator system according to the present disclosure has the advantages according to the corresponding method as set out herein.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something in this document is intended to mean the same as the entity being "configured for", or "intentionally adapted for" doing this very something.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
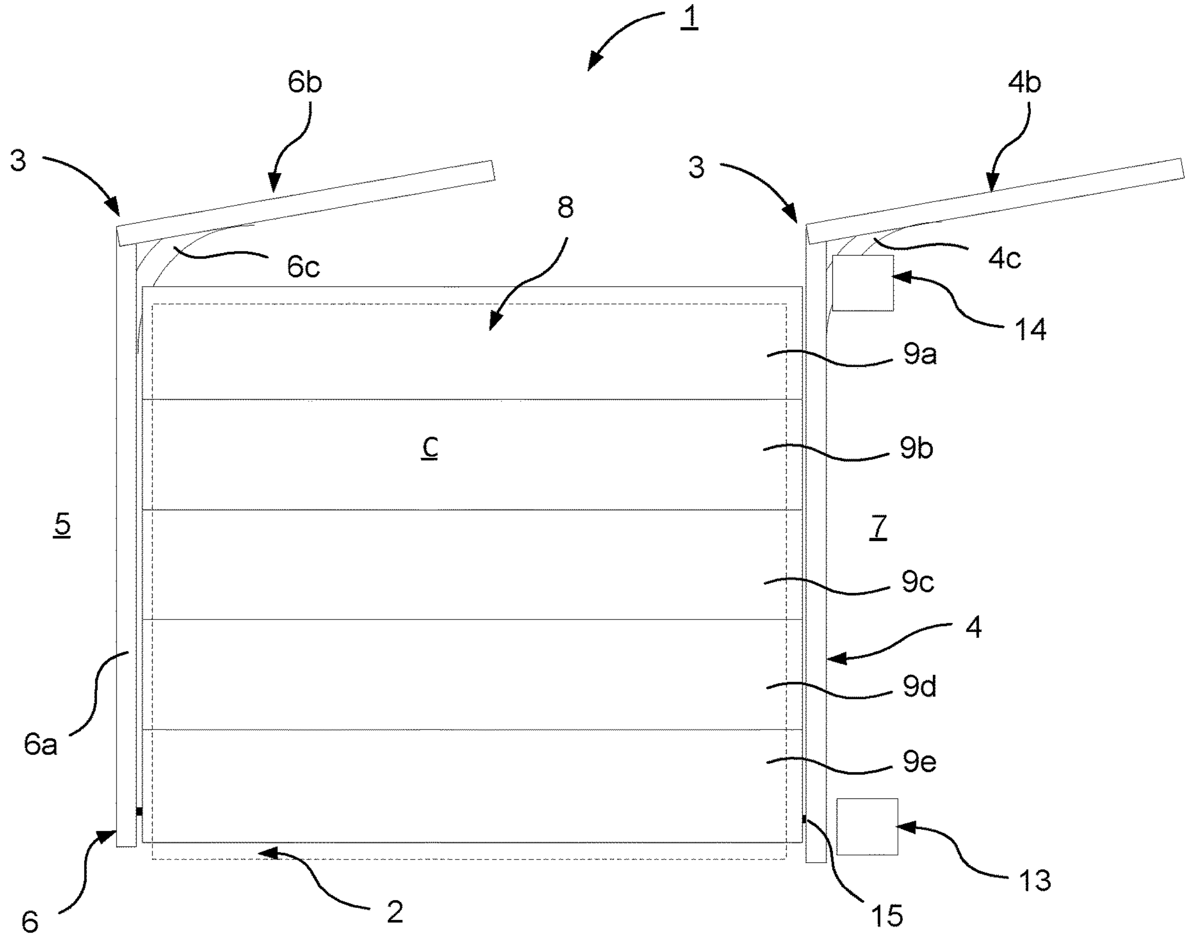
FIG. 1 is a schematic perspective view of an overhead door operator system comprising a door in a closed position.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 is schematic views of a door operator system 1 in which the inventive aspects of the present invention may be applied. The door operator system comprises a door frame 3, a drive unit 10 (shown in FIG. 2*a-c*) and a door 8. The door operator system 1 is arranged to be installed in an opening 2 defined by a wall and a floor. The door 8 is connected to the door frame 3. The door operator system 1 is arranged to open and close the opening 2 by moving the door 8 between an open position O and a closed position C. The open position O may be a horizontal open position O, in the form of a planar horizontal position or an inclined horizontal position. The closed position C may be a vertical closed position C.

In this embodiment, the door 8 is a sectional door 8 comprising a plurality of horizontal and interconnected sections 9*a-e* connected to the door frame 3. In one embodiment, the door is a garage door. In an alternative embodiment, the door is an industrial door. The door 8 is arranged to be moved along the door frame 3 between the closed position C and the open position O.

As shown in FIG. 1, the door operator system 1 may comprise a first terminal 13 and a second terminal 14. The at least one terminal 13, 14 is configured to transmit energy for charging an energy storage device, such as a battery, for powering the motor of the drive unit. In an alternative embodiment, power may be supplied to motor of the drive unit by means electric wiring.

The door operator system is an up and over door operator system. An up and over door operator system is a system in which the door in the closed position C is arranged substantially vertical and in the open position O is arranged substantially horizontal and inside of the opening.

In an alternative embodiment, the door operator system may be a door operator system in which the door in the closed position C is arranged substantially vertical and in the open position O is arranged in an inclined position disposed between a substantially vertical and a substantially horizontal position. For example, the door may be arranged at a 45° angle from a horizontal position in the open position O, as the skilled person recognizes however the door may be arranged at any angle disposed between the horizontal and vertical orientation of the door in the open position O.

The door frame 3 comprises a first frame section 4 at a first side 7 of the opening 2 and a second frame section 6 at a second side 5 of the opening 2. The door frame 3 is connected to the wall and to the floor, i.e. the floor of the opening 2. In one embodiment, the first frame section 4 comprises a substantially vertically extending part 4*a* and a substantially horizontally extending part 4*b*. The second frame section 6 comprises a substantially vertically extending part 6*a* and a substantially horizontally extending part 6*b*. The vertically extending part 4*a*, 6*a* and the horizontally extending part 4*b*, 6*b* are connected to create a path for the door 8 to glide on and a track for the drive unit 10 to interact with.

Thus, each of the first frame section 4 and the second frame section 6 comprising a vertically extending part 4*a*, 6*a*, a horizontally extending part 4*b*, 6*b* and a bent interconnecting part 4*c*, 6*c*. Worded differently, The first frame section 4 comprises a vertically extending part 4*a*, a horizontally extending part 4*b* and a bent interconnecting part 4*c*. The bent interconnecting part 4*c* thus connects the vertically extending part 4*a* and the horizontally extending part 4*b*. Similarly, the second frame section 6 comprises a vertically extending part 6*a*, a horizontally extending part 6*b* and a bent interconnecting part 6*c*. The bent interconnecting part 6*c* thus connects the vertically extending part 6*a* and the horizontally extending part 6*b*.

The vertically extending parts 4*a*, 6*a* may be vertical parts 4*a*, 6*a* or inclined vertical parts 4*a*, 6*a*. Similarly, the horizontally extending parts 4*b*, 6*b* may horizontal parts 4*b*, 6*b* or inclined horizontal parts 4*b*, 6*b*.

Referencing FIG. 1, the door 8 is directly or indirectly connected to the door frame 3. The door 8 is at a first side moveably connected to the first frame section 4 and at a second side moveably connected to the second frame section 6. In one embodiment, one or more of the plurality of sections 9*a-e* is connected to the first frame section 4 at said first side 7 and to the second frame section 6 at said second side 5.

Figure 2A:
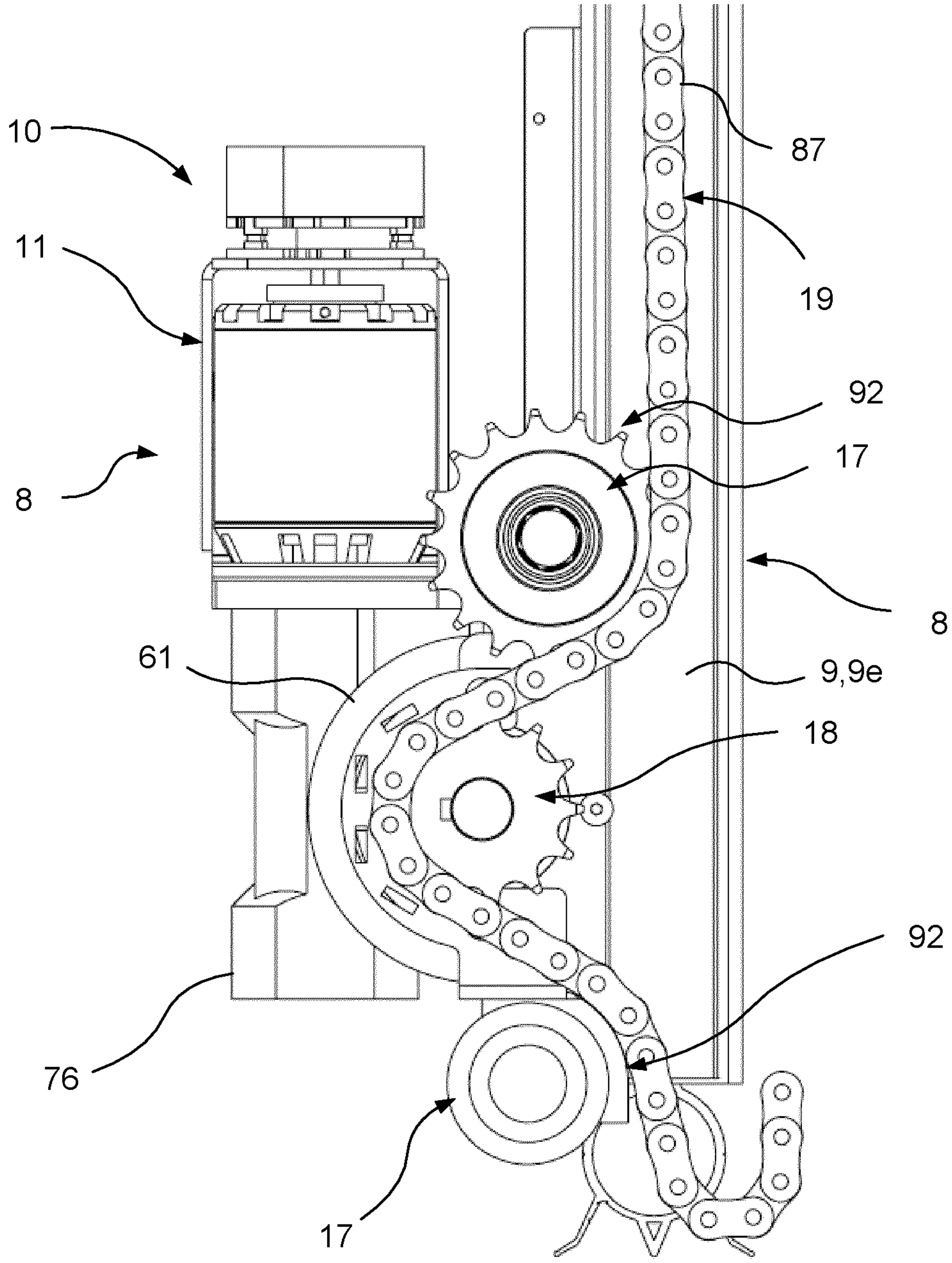
FIG. 2*a* is a schematic perspective view of a drive unit for an overhead door operator system according to an aspect of the present disclosure.
Figure 2B:
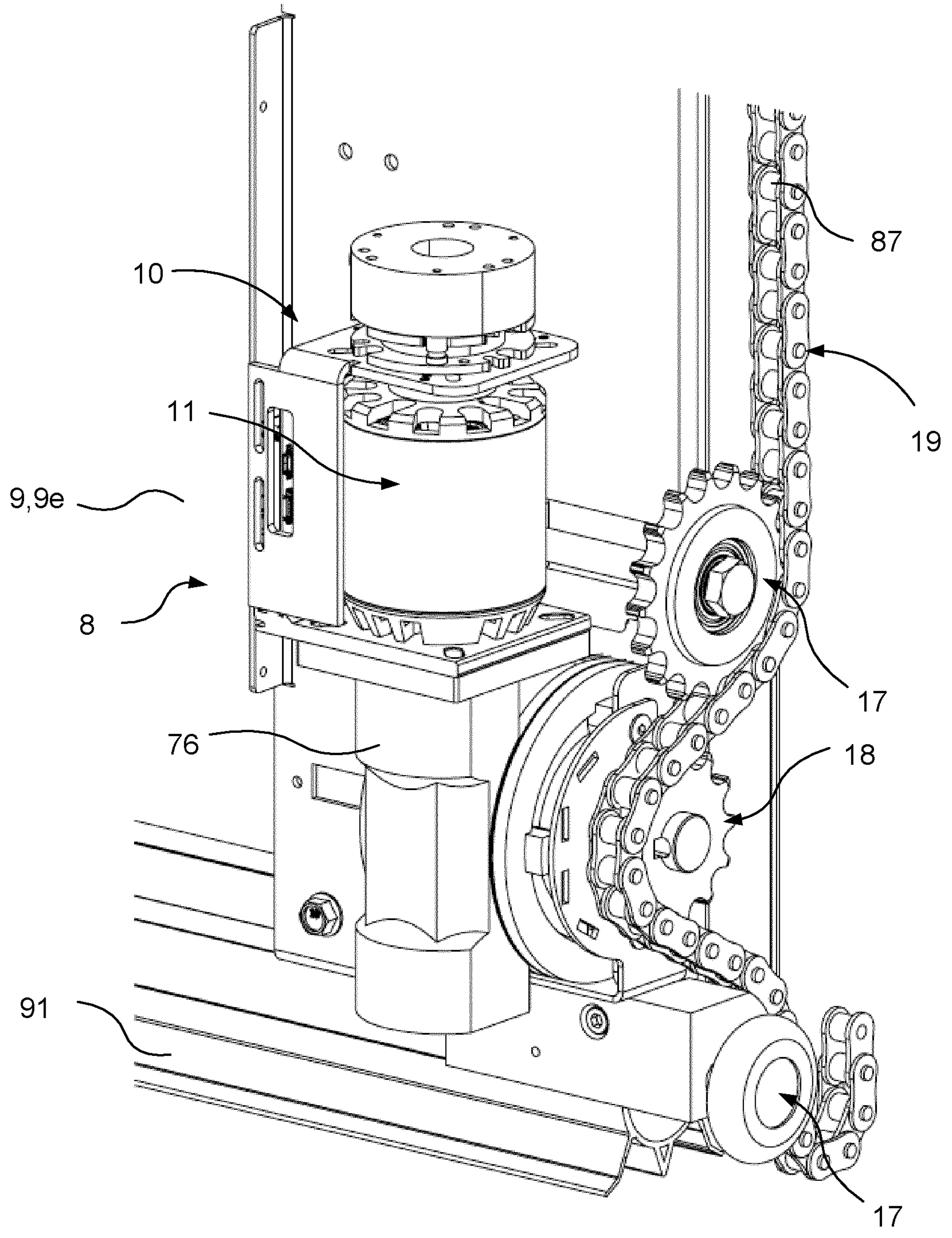
FIG. 2*b* is a schematic perspective view of a drive unit for an overhead door operator system according to an aspect of the present disclosure.
Figure 2C:
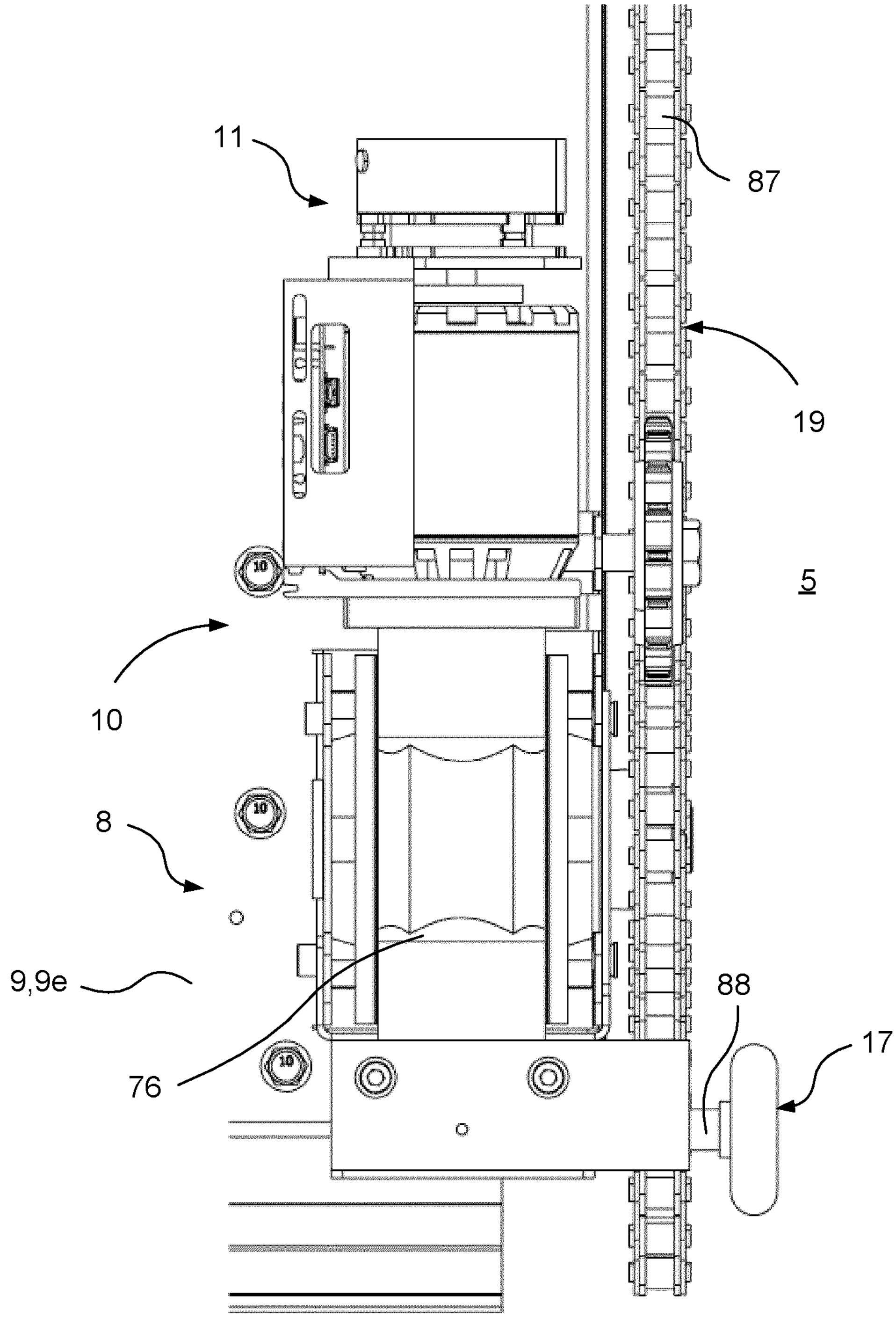
FIG. 2*c* is a schematic perspective view of a drive unit for an overhead door operator system according to an aspect of the present disclosure.

With reference to FIG. 2*a-c*, the drive unit 10 is mounted on the door 8. The drive unit 10 comprises at least one motor 11. The at least one motor 11 is arranged to move the door 8 from the closed position C to the open position O.

To allow for the driving of the door 8, the overhead door operator system 1 further comprises an elongated transmission member 19 extending along the first side 7 of the opening 2. The elongated transmission member 19 may further extend along the first frame section 4. The drive unit 10 further comprises a driven transmission member 18 which is in driving connection with the motor 11. The driven transmission member 18 is movably connected to the elongated transmission member 19 and arranged to interplay with said elongated transmission member 19 for driving the driven transmission member 18 along said elongated transmission member 19 by means of the elongated transmission member 19 at least partially wrapping around the driven transmission member 18. Thus, the elongated transmission member 19 is arranged to at least partially envelope said driven transmission member 18.

The elongated transmission member does in comparison with a fixed rack provide a more cost-efficient solution both in terms of manufacturing and installation. Furthermore, the elongated transmission member allows for relative movement between the door 8 and the frame and does not require a high accuracy and proper aligning in the same manner as a fixed rack solution. The elongated transmission member may thus be arranged to allow for a degree of movement along a direction orthogonal to the first frame section 4.

Further, the elongated transmission member enables a safer door operator system due to said elongated transmission member following and keeping the engagement with the driven transmission member, at least to some extent, even if the door is pushed away from the rail. In addition, the elongated transmission member is more silent and resistant to wear compared to a fix rack and less likely to malfunction due to pinching of external objects.

The elongated transmission member 19 may be in the form of a bendable transmission member. The elongated transmission member 19 may be in the form of a suspended transmission member. It is noted that bendable in this context does not necessarily imply that said transmission member necessarily is flexible but only that it allows for wrapping around the driven transmission member. Accordingly, the transmission member 19 may be considered to be arranged to be in engagement with the driven transmission member 18 and provide for relative movement between the driven transmission member 18 and a direction of movement of the door 8 as defined by the frame 3. Worded differently said transmission member may be considered as a non-fix transmission member or a suspended transmission member. The elongated transmission member may accordingly be arranged to engage the driven transmission member independently of the frame.

The drive unit 10 is moveably connected to the elongated transmission member 19. Accordingly, drive unit 10 is connected to said elongated transmission member 19 so as to allow for relative movement between the door and the frame, whereby the drive unit is fixed to the door. The drive unit 10 comprises at least one motor 11. The drive unit 10 is arranged to move the door 8 from the closed position to the open position. To provide power to the motor 11, the at least one motor 11 may be connected to at least one energy storage device, such as a battery, arranged to power the at least one motor 11. The drive unit 10 is arranged to move the door 8 from the closed position C to the open position O.

In one embodiment, the drive unit 10 is arranged to move the door from the open position O to the closed position C. In one embodiment, the door 8 is arranged to move from the open position O to the closed position C by means of the weight of the door 8. In one embodiment, the drive unit 10 is arranged to brake the door 8 when moving from the open position O to the closed position C.

In one embodiment, the elongated transmission member may be suspended only by means of a top end and a bottom end.

The elongated transmission member 19 may be biased. The biasing of the elongated transmission member 19 enables keeping of the tension of the resilient elongated member 19 at a suitable level and further compensates for wear and potential tolerance issues.

In one embodiment, the elongated transmission member 19 may be biased by means of a spring arrangement. A top end of the elongated transmission member 19 may be fixedly mounted and a bottom end of said elongated transmission member 19 may be spring-loaded. This allows for easier access for an operator performing service work involving the spring. In one embodiment, the top and bottom end of the elongated transmission member 19 is mounted to the frame, for example the first frame section 4.

In one embodiment, the overhead door operator system further comprises at least one guide member 92. The at least one guide member 92 is mounted to the door 8. The guide member 92 may be arranged to interplay with the elongated transmission member 19 for guiding the door 8 along the elongated transmission member 19 by means of the elongated transmission member 19 at least partially wrapping around the at least one guide member 92. The guide member 92 thus moves the elongated transmission member 19 and guides the driven transmission member 18 in relation to said elongated transmission member 19 to properly align them. Hence, a more reliable door operator system may be achieved. The guide member 92 may preferably be a rotatable guide member which may be mounted to the door 8 by means of a journaled connection. Thus, the elongated transmission member 19 may be arranged to at least partially envelope said guide member 92.

Referencing FIG. 2*a-c*, the elongated transmission member 19 may be arranged to wrap around and interplay with a portion of the driven transmission member 18 and a portion of the guide member 92. The portion of the driven transmission member 18 interplaying with the elongated transmission member 19 being opposite to the portion of the guide member 92 interplaying with said elongated transmission member 19. This achieves a larger interface between the driven transmission member, guide member and elongated transmission member, whereby a more stable overhead door operator system which requires less torque to operate may be achieved.

As shown in e.g. FIG. 2*c*, the elongated transmission member 19 is there suspended along the first side 7 of the opening.

The elongated transmission member 19 may be any conventional elongated transmission member 19 providing the required slack to compensate for horizontal or diagonal movement of the drive unit and/or door. The elongated transmission member may be a belt or a chain.

In one embodiment, the elongated transmission member 19 may be a belt. Thus, the guide member 92 and the driven transmission member 18 may be pulley elements arranged to interface with said belt. In one embodiment, the belt may be a cogged belt or a ribbed belt, whereby the guide member 92 and the driven transmission member 18 may be cogged wheels interfacing with the ribs of said cogged or ribbed belt.

The elongated transmission member 19 may also be a chain, which is depicted in FIG. 2*a-c*. The chain may be provided with slots for receiving cogs. Accordingly, the driven transmission member 18 may be a cogged wheel arranged to interplay with the chain, e.g. the slots of the chain. The driven transmission member 18 may be a sprocket. Further, the guide member 92 may be a cogged wheel arranged to interplay with the chain, e.g. the slots of the chain. The guide member 92 may be a sprocket. In one embodiment, the guide member 92 may be a ribbed wheel for interplaying with the chain. In one embodiment, the chain is an endless chain enveloping the guide member(s) and the driven transmission member(s). In one embodiment, the chain is a non-endless chain, e.g. a single chain only partially enveloping the guide member(s) and the driven transmission member(s).

In one embodiment, the overhead door operator system further comprises a first set of guide rollers 17 and a second set of guide rollers 17. Said first and second set of guide rollers are mounted to the door 8. The first set of guide rollers 17 are arranged to interplay with the first frame section 4 and the second set of guide rollers 17 are arranged to interplay with the second frame section 6. The guide rollers thus moves together with the door 8 in a guided manner along the trajectory formed by the frame, e.g. the first frame section 4 and the second frame section 6.

In one embodiment, the door 8 is a sectional door. Hence, the door comprises a plurality of horizontal and interconnected sections 9*a-e* (as depicted in FIG. 1).

Again referring to FIG. 2*a-c*, the drive unit 10 is mounted on a section 9*e* of the door 8. To make the movement of the section smoother, the section onto which the drive unit 10 is mounted is provided with two pairs of guide rollers. A first and second upper guide roller accordingly extend from the section 9*e* towards the first frame section 4 and the second frame section 6, respectively. Similarly, a first and second lower guide roller extend from the section 9*e* towards the first frame section and the second frame section 6, respectively.

In one embodiment, the drive unit 10 is mounted to the bottommost section 9*e* of the door 8. According to such an embodiment, the first and second lower guide roller may be disposed adjacent to a bottom horizontal end phase of the bottommost section 9*e*. The upper guide rollers may correspondingly be disposed adjacent to a top horizontal end phase of the bottommost section 9*e*.

In one embodiment, upper and lower guide rollers may be mounted to each section 9*a-e*. Preferably, the upper guide rollers are disposed adjacent to the upper horizontal end phase and the lower guide rollers are disposed adjacent to the bottom horizontal end phase of each section.

The at least one guide member 92 may be arranged coaxially with one of the guide rollers 17. The coaxial arrangement reduces the force on the guide member due to the frame and guide roller taking up some of the load during the movement of the door. Hence, resulting forces to the door sections and bearings of the drive unit and/or guide member are reduced. Furthermore the coaxial arrangement allows for more of the elongated transmission member to be disposed behind the guide rollers which decreases the exposure of said elongated transmission member. The guide roller 17 is mounted to the door 8 by means of a shaft 88. Both the guide roller 17 and the guide member 92 are mounted to the shaft. The guide member 92 may be fixedly attached to the shaft 88. Advantageously, the guide roller 17 and the guide member 92 may be arranged adjacent to the bottom horizontal edge of the door 8. In one embodiment, the guide member is integrated into the guide roller.

Coaxial herein implies that the guide roller and the guide member are arranged parallel to each other along a horizontal axis extending. The horizontal axis extends between the first and second frame section.

In one embodiment, the guide member is coaxial with the guide roller being disposed adjacent to a bottom horizontal end phase of the bottommost section 9*e* of the door. This is particularly advantageous due to it providing a superior pivoting position of the door. The guide roller and the guide element hence creates a common low pivot point for the door when the door is approaching its open position O when the overhead door operator system is an up and over door operator system. This significantly reduces the space required above the door opening compared to for example a door with driven sections utilising for example a fix rack.

In one embodiment, a first upper guide member 92 is arranged coaxially with the first upper guide roller 17. Correspondingly, a first lower guide member 92 is arranged coaxially with the first lower guide roller 17. Hence, the section 9*e* which is driven may be both guided along the elongated transmission member 17 and the frame at the same axes. This further increases the stability and decreases the load on the section onto which the drive unit 10 is mounted. Preferably, the section is the bottommost section and the lower guide member and the lower guide wheel are arranged adjacent to the bottom phase of said bottommost section. Hence, one of the guide rollers 17 and one of the guide member 92 may be arranged coaxially to each other adjacent to the bottom horizontal edge of the door 8. This may be the case in a single section door as well.

Figure 3A:
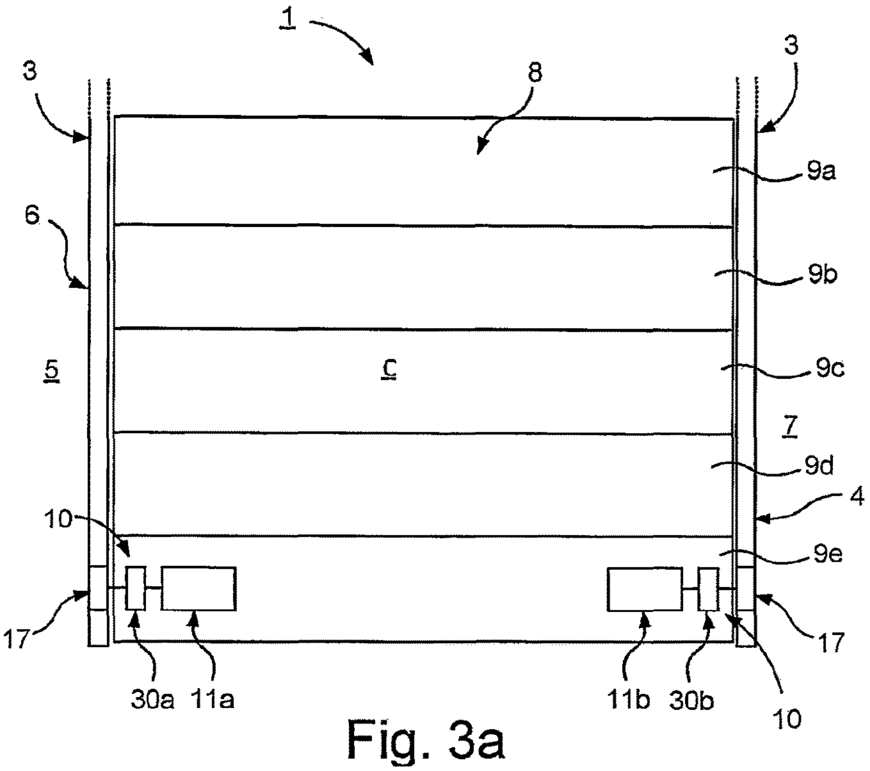
FIG. 3*a* is a schematic perspective view of an overhead door operator system comprising a door in a closed position according to an aspect of the present disclosure.
Figure 3B:
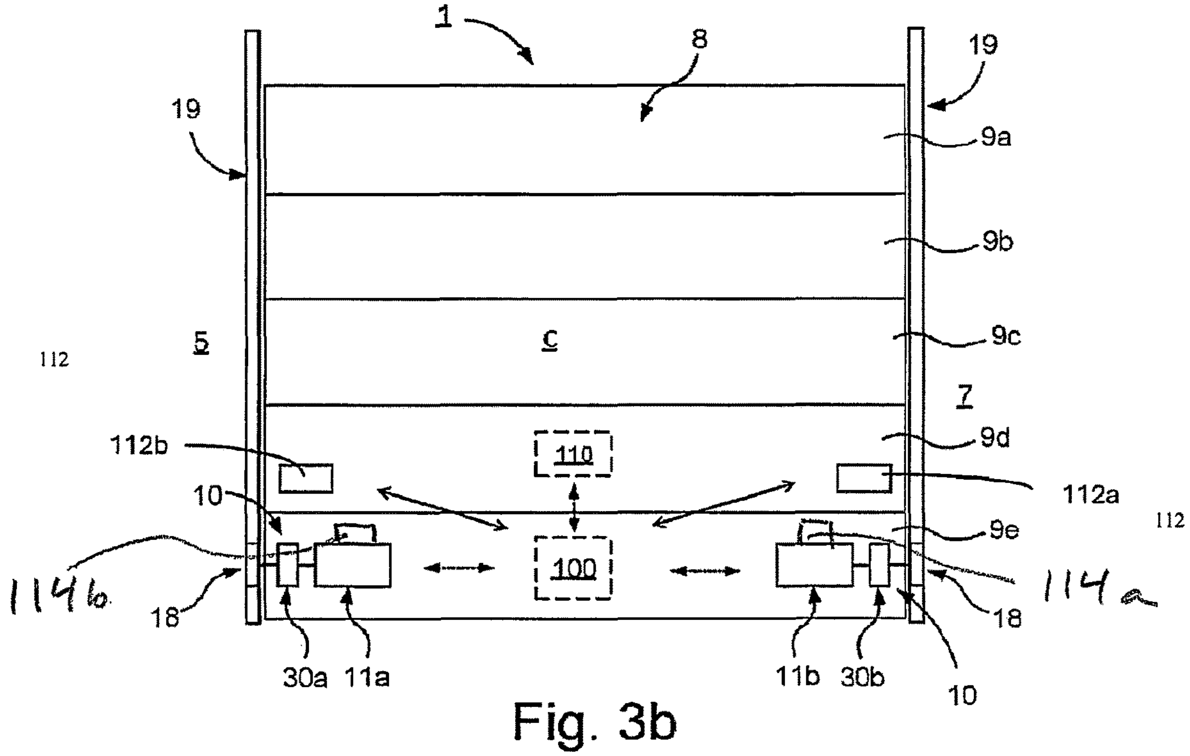
FIG. 3*b* is a schematic perspective view of an overhead door operator system comprising a door in a closed position according to an aspect of the present disclosure.

In one embodiment, see e.g. FIG. 3*b*, the overhead door operator system comprise a pair of elongated transmission members to allow for a more stable movement pattern of the door 8. A first elongated transmission member 19 extends along the first side 7 of the opening 2. The first elongated transmission member 19 may further extend along the first frame section 4. A second elongated transmission member 19 extends along the second side 5 of the opening 2. The second elongated transmission member 19 may further extend along the second frame section 6. The guiding and driving arrangements discussed with reference to the first side of the door may accordingly be mirrored to the second side of the door.

Thus, the overhead door operator system may further comprise a first and second driven transmission member 18 arranged to interplay with the first and second elongated member 19 by means of the first and second elongated transmission member at least partially wrapping around the first and second driven transmission member, respectively.

The first and second driven transmission member 18 may be driven by means of a single or multiple motors 11. In one embodiment, a single motor 11 is in driving connection with the first and second transmission member 18. The single motor 11 may be connected to the first and second driven transmission members 18 by means of a first and second shaft extending from the motor 11. As will be further described with reference to FIG. 3, the drive unit 10 may comprise a first and a second motor each being in driving connection with the first and second driven transmission member 18, respectively.

Analogously to the first vertical side of the door, the second side of the door may have one or more guide members mounted thereon. In one embodiment, the overhead door operator system further comprises at least one guide member 92 mounted to the door 8 arranged to interplay with the second elongated transmission member for guiding the door 8 along the second elongated transmission member 17 by means of the second elongated transmission member at least partially wrapping around said guide member. Worded differently, said door operator system comprises at least one first guide member 92 mounted on the door 8 arranged to interplay with the first elongated transmission member 19 and at least one second guide member 92 mounted on the door 8 arranged to interplay with the second elongated transmission member 19 by means of the first and second elongated transmission member at least partially wrapping around the first and second guide member, respectively.

Both the elongated transmission members 19 may be biased by means of spring arrangements. A top end of the elongated transmission members 19 may be fixedly mounted and a bottom end of said elongated transmission members 19 may be spring-loaded. This allows for easier access for an operator performing service work involving the spring. In one embodiment, the top and bottom ends of the elongated transmission members 19 are mounted to the frame, e.g. to the first and second frame section, respectively.

In one embodiment, which is exemplified in FIG. 2*b*, the first driven transmission member 18 may be arranged between a first upper and a lower guide member 92. The first upper and lower guide member 92 are arranged to interplay with the first elongated transmission member 19 by means of the first elongated transmission member at least partially wrapping around the first upper and lower guide member. Similarly, the second driven transmission member 18 may be arranged between a second upper and a lower guide member 92. The second upper and lower guide member 92 are arranged to interplay with the second elongated transmission member by means of the second elongated transmission member at least partially wrapping around the second upper and lower guide member. This enables additional guiding of the elongated transmission member(s) both before and after the driven transmission member(s) in the driving direction without requiring a surplus of components. Hence, a less complex operator assembly may be achieved. Further, this achieves a larger interface between the elongated transmission member and the guiding members over the driven transmission member, resulting in a more stable door operator system which requires less torque to operate.

The first and second driven transmission member 18 may thus be arranged to extend from the door 8 in opposite directions towards the first and second elongated transmission member 19, respectively. The first driven transmission member 18 may be arranged proximal to a first vertical phase of the door, said first phase being adjacent to the first elongated transmission member when the door is in the closed position. Similarly, the second driven transmission member 18 may be arranged proximal to a second vertical phase of the door, said second phase being adjacent to the second elongated transmission member when the door is in the closed position.

The elongated transmission members 19 may be arranged to wrap around and interplay with a portion of the driven transmission member 18 and a portion of the upper and lower guide members 92. The portion of the driven transmission member 18 interplaying with the elongated transmission member 19 being opposite to the portions of the upper and lower guide member 92 interplaying with said elongated transmission member 19. This achieves a larger interface between the driven transmission member, guide member and elongated transmission member, whereby a more stable overhead door operator system which requires less torque to operate may be achieved.

In one embodiment, wherein only a first elongated transmission member is in driving connection with the transmission member, the door operator system may only comprise a first upper and lower guide member according to the above.

In one embodiment wherein the drive unit 10 is mounted to a section 9*e* of the door 8, a first upper guide member 92 arranged to interplay with the first elongated transmission member 19 may be arranged adjacent to a top phase of the section 9*e*. A first lower guide member 92 arranged to interplay with the first elongated transmission member 19 may be arranged adjacent to a bottom phase of the section 9*e*. A second upper guide member 92 arranged to interplay with the second elongated transmission member 19 may be arranged adjacent to a top phase of the section 9*e*. A second lower guide member 92 arranged to interplay with the second elongated transmission member 19 may be arranged adjacent to a bottom phase of the section 9*e*.

In one embodiment, the first upper guide member 92 may be arranged coaxially with the first upper guide roller 17 for interplaying with the first elongated transmission member 19 by means of the first elongated transmission member at least partially wrapping around the first upper and lower guide member. The first lower guide member 92 may be arranged coaxially with the first lower guide roller 17 for interplaying with the first elongated transmission member 19. The second upper guide member 92 may be arranged coaxially with the second upper guide roller 17 for interplaying with the second elongated transmission member 19 by means of the second elongated transmission member at least partially wrapping around the second upper and lower guide member. The second lower guide member 92 may be arranged coaxially with the second lower guide roller 17 for interplaying with the second elongated transmission member 19.

As depicted in FIG. 2*a*-*c*, the drive unit 10 may comprise a reduction gearing 76 to provide additional torque between the motor and the driven transmission member 18. The reduction gearing 76 connects the driven transmission member 18 and the motor 11. The reduction gearing may be in the form of a gearbox 76. A gearbox 76 enables selective torque control between for example a high speed mode and a high torque mode of the door operator system.

In one embodiment wherein the drive unit 10 comprises a single motor, the motor is connected to the reduction gearing 76 which may be in the form of the gearbox, whereby an output shaft of the gearbox is connected to the first and second driven transmission member 18 so as to transfer torque to said first and second driven transmission member 18, or in the case of the operator system only having one elongated transmission member, the single driven transmission member.

In one embodiment wherein the drive unit 10 comprises the first and second motor. The first motor may be connected to a first reduction gearing, such as a gearbox, in turn connected to the first driven transmission member. The second motor may be connected to a second reduction gearing, such as a gearbox, in turn connected to the second driven transmission member.

The overhead door operator system may further comprise at least one transmission member protector 61. The transmission member protector 61 is arranged to at least partially enclose the driven transmission member 18 and a portion of the elongated transmission member 19 interplaying with said driven transmission member 19. The transmission member protector 61 is for preventing the elongated transmission member 19 being brought out of engagement with the driven transmission member 18. Hence, a safer overhead door operator system may be achieved. The transmission member protector 61 may also serve as a mean to prevent a human to come into contact with the elongated transmission member 19.

The transmission member protector 61 may be arranged to extend outwardly, i.e. horizontally, from the door 8 across the elongated transmission member 19 to cover said elongated transmission member 19. The transmission member protector 61 may be attached to the door 8 or the drive unit 10.

In one embodiment, in which a plurality of driven transmission members 18 are utilized, the overhead door operator system may comprise a plurality of transmission member protectors 61. Each transmission member protector 61 may be arranged to at least partially enclose a corresponding driven transmission member 18 and the portion of the elongated transmission member 19 interplaying with said driven transmission member 18.

In one embodiment, the overhead door operator system may further comprise a transmission member tensioner for spring-loading the elongated transmission member 19, wherein the top and bottom end of the elongated transmission member 19 are fixedly mounted and the transmission member tensioner is attached to the door 8. The transmission member tensioner may comprise a roller element arranged to interplay with the elongated transmission member 19.

The overhead door operator system may comprise a spring arrangement. The bottom end of the elongated transmission member 19 may be attached to a fix point by means of said spring arrangement. The fix point may be a point on the frame or the floor. The spring arrangement may be connected to the frame 3, for example the first frame section 4, and the bottom end of the elongated transmission member 19. The elongated transmission member 19 may be routed downwards around a console element disposed adjacent to the floor of the opening and upwards towards the spring arrangement.

As seen in FIG. 2*b*-*c*, the overhead door operator system may further comprise a resilient panel 91. The resilient panel 91 is attached to the door 8. The resilient panel 91 extends from the bottom horizontal edge 8 of the door and is further arranged to come into contact with a floor of the opening 2 when the door is in the closed position C. Said resilient panel 91 deforms when coming into contact with the floor upon the door 8 closing, whereby the door 8 is protected from the impact and wear due to coming into direct contact with the floor. Further the resilient panel 91 may provide a sealing effect between the floor and the door when the door is in the closed position. In one embodiment, the resilient panel 91 may be in a rubber material.

Turning to FIG. 3*a*-*b*, which more closely depicts an overhead door operator system in which the drive unit comprises two motors 11*a*, 11*b*. The first motor 11*a* and second motor 11*b* may be arranged on the same horizontal section 9*e* of the door 8. The first and second motor may be arranged on the bottommost horizontal section 9*e* of the door 8. The first motor 11*a* and the second motor 11*b* may be mounted at different vertical sides of the door 8, e.g. the first motor 11*a* may be disposed at a vertical side of the door 8 proximal to the first side 7 of the opening and the second motor 11*b* may be disposed at a vertical side of the door 8 proximal to the second side 5 of the opening.

In one embodiment, the drive unit 10 at least comprises a first motor 11*a* and a second motor 11*b*, the first motor 11*a* and the second motor 11*b* may be mounted at the same vertical sides of the door 8. The first and second motor may be arranged on the same horizontal section of the door 8. The first and second motor may be arranged on the bottommost horizontal section 9*e* of the door 8.

In one embodiment, the first motor 11*a* is moveably connected to the first elongated transmission member 19 by means of the first driven transmission member 18 and the second motor 11*b* is moveably connected to the second elongated transmission member 19 by means of the second driven transmission member 18.

The motors 11 and the drive unit 10 are preferably arranged on the same main phase of the door 8, e.g. an outer or inner phase of the door 8. To protect the motors 11 and drive unit 10, said motors and drive unit are arranged on an inner phase of the door in the form of an interior facing door phase of the door 8.

In one embodiment, the motor(s) 11 of the drive unit 10 is a direct current DC motor 11. In a preferred embodiment, the motor(s) 11 is a brushless direct current (BLDC) motor(s).

A control unit may be in operative communication with the drive unit 10. The control unit may be in wired communication with the two motors 11*a*, 11*b* or be in a wireless communication.

The overhead door operator system 1 comprises a control device 100 for controlling the overhead door operator system 1. The control device 100 according to an aspect of the present disclosure is described in more detail below with reference to FIG. 4. The control device 100 may comprise one or more control units, e.g. electronic control units.

The control device 100 is configured to receive one or more signals from a detection device 110 for detecting movement of the door of the overhead door operator system 1. The overhead door operator system 1 may thus comprise or be operably connected to a detection device for detecting movement of the door 8. The detection device 110 may comprise one or more detectors arranged in connection to the door. The detection device 110 may comprise one or more acceleration detector units, e.g. accelerometers. The detection device 110 may comprise one or more vibration sensors. The detection device 110 may comprise one or more torque detection units for detecting torque of the respective motor 11*a*, 11*b* of the drive unit 10.

The control device 100 is configured to, based on the received signals, determine whether or not the thus detected door movement is related to an unexpected door movement, and, if it is determined that detected door movement is related to an unexpected door movement, take action so as to prevent more extensive damages.

The control device 100 may be configured to activate a brake function for preventing uncontrolled movement of the door. The drive unit 10 may comprise at least one brake member 30*a*, 30*b*. The control device 100, when activating a brake function for preventing uncontrolled movement of the door, may be configured to activate the at least one brake member so as to provide a brake force by means of the at last one brake member against the first side 7 and/or the second side 5 so as to prevent movement of the door. The control device 100, when taking action, may be configured to prevent operation of the door operator system 1 associated with opening and closing the opening 2.

As shown in FIG. 3*b*, the overhead door operator system 1 comprises a drive unit 10 comprising a first transmission member 19 extending along the first side 7 and a second transmission 19 extending along the second side 5. The first elongated transmission member 19 is thus arranged in connection to the first frame section 4 and the second elongated transmission member 19 in connection to the second frame section 6. As shown in FIG. 3*b*, the drive unit 10 of the overhead door operator system 1 comprises a first driven transmission 18 arranged to interplay with the first elongated transmission member 19 and a second driven transmission member 18 arranged to interplay with the second elongated transmission member 19.

The control device 100 may be configured to receive one or more signals from detection associated with movement of the door in connection to the first side 7 and one or more signals from detection associated with movement of the door in connection to the second side. The control device 100 may be configured to compare the signals associated with door movement in connection to the first side 7 with the signals associated with door movement in connection the second side 5; and determine that the thus detected door movement is related to an unexpected door movement if the difference of door movement in connection to the first side 7 compared with door movement in connection the second side 5 exceeds a certain threshold.

The control device 100 may be configured to store information from the detection associated with opening and closing movement of the door during normal operation. The control device 100 may be configured to compare the signals associated with door movement with the thus stored information from the detection associated with opening and closing movement of the door during normal operation; and determine that the thus detected door movement is related to an unexpected door movement if the difference between detected door movement compared with the thus stored information of door movement during normal operation exceeds a certain threshold.

The control device may be configured to control the movement of the drive unit 10, i.e. when and how the drive unit 10, and its associated motors 11*a*, 11*b*, should move the door 8. The control device is arranged to receive input of if the door 8 should be opened or closed. In one embodiment, the control device is arranged to receive the input from one or more of a user interface, a mechanical button or a remote control. In one embodiment, the control device is arranged to receive input from sensors for automatic operation of the door.

The drive unit may further comprise additional motors which will now be described further.

In one embodiment, not shown, the drive unit 10 may comprise a third and a fourth motor mounted on a second horizontal section 9 of the horizontal sections and arranged to assist the first and second motors 11*a-b* when moving the sectional door 8 from the closed position C to the open position O. In an embodiment with also third and fourth motors, those motors may also, according to an aspect of the present disclosure, be operably connected to the control unit 100 and arranged to be controlled by the control unit in the same way as described above in relation to the first and second motor. In one embodiment, the system 1 comprises four motors and one control unit. The first and second motor 11*a*, 11*b* are arranged on one section 9*e* and the third and fourth motor are arranged on another section, e.g. section 9*c*. The drive unit 10 may hence comprise a third driven transmission member mounted to the door 8. The third driven transmission member being movably connected to the first elongated transmission member 19 for driving said third driven transmission member 19 along said first elongated transmission member 19. Further, the drive unit may comprise a fourth driven transmission member mounted to the door 8. The fourth driven transmission member may be movably connected to the second elongated transmission member 19 for driving said fourth driven transmission member along said second elongated transmission member 19. The drive unit may further comprise guide wheels and guide rollers associated with the third and fourth driven transmission member in accordance with what is described with reference to FIG. 2*a-c*.

In one embodiment, the first and second motor 11*a*, 11*b* are arranged on a section 9*e* that is located on the section 9 of the door being closest to the floor in the closed position C. However, it should be noted that the section 9*e* could for example also be the section 9*d* which is the section being arranged next to the section being closest to the floor in the closed position C.

In one embodiment, not shown, the drive unit 10 may comprise a fifth and a sixth motor mounted on a third horizontal section 9 of the horizontal sections 9 and arranged to assist the other motors 11 when moving the sectional door 8 from the closed position C to the open position O.

In the embodiments where additional sections 9*a-e* are arranged with motors, these may be arranged on every other section, every section or at one section being arranged above the section 9*e*.

In one embodiment the first, second, third or the first, second, third and fourth motor may be arranged on a section 9. Preferably, said motors may be arranged on the bottom-most section 9*e*.

In one embodiment, at least one motor 11 of the drive unit 10 is configured to brake the movement of the door 8 when the door 8 is moved from the open position O to the closed position C. In one embodiment in which the operator system has two motors, both the first and second motor 11*a* and 11*b* are configured to brake the movement of the door 8 when the door 8 is moved from the open position O to the closed position C. According to an aspect of the present disclosure, the brake function of the first motor 11*a* and/or second motor 11*b* may be activated if it has been determined that detected movement of the door 8 is related to an unexpected door movement.

In one embodiment, at least one motor 11 of the drive unit 10 is configured to act as a generator and to charge the at least one energy storage device when the door 8 is moved from the open position O to the closed position C. In one embodiment, both the first and second motor 11*a*, 11*b* of the drive unit 10 is configured to act as a generator and to charge the at least one energy storage device when the door 8 is moved from the open position O to the closed position C. Due to the weight of the door 8 forcing the door towards the closed position, the at least one motor of the drive unit is caused to rotate, whereby the motor may generate power for charging said energy storage device.

At least one motor 11 of the drive unit 10 may further comprise a brake member. In one embodiment, both the first 11*a* and the second motor 11*b* comprises the brake member. In one embodiment, the brake member is an electromagnetic brake. The brake member may be arranged to control/reduce the speed of the door 8 when it is moved from the open position O to the closed position C. In one embodiment, the brake member is arranged to keep the door from moving in any position along the trajectory of door between the closed position and open position. According to an aspect of the present disclosure, the brake member of the first motor 11*a* and/or second motor 11*b* may be activated if it has been determined that detected movement of the door 8 is related to an unexpected door movement.

In one embodiment, the drive unit 10 is mounted to a section 9*e*, i.e. one of said plurality of horizontal and interconnected sections, of the door 8. The first motor 11*a* and the second motor 11*b* are arranged on the same section 9*e*. Preferably, the first motor 11*a* and the second motor 11*b* are arranged at different vertical sides of the section 9*e*. Each motor 11*a*, 11*b* is thus arranged in conjunction to the first frame section 4 and the second frame section 6, respectively.

In one embodiment, the door 8 could be horizontal, or at least at an angle in view of the closed position C, and the door 8 is positioned inside of the opening 2 and above the opening 2. When moving from the closed position C to the open position O, the sections 9 of the door that are interconnected will push on each other such that the whole door 8 will move upwards. The sections 9 will rotate and move in relation to each other when moving from a vertical position to the horizontal position.

In one embodiment, at least one of the first and second motor 11 is run as a generator 11 when moving the door 8 from the open position O to the closed position C. As the sprocket(s) 18 are rotated the generator 11 is rotated. The generator 11 reduces the speed of the door 8. The generator 11 that is connected to the energy storage device charges said energy storage device when moved. By using the kinetic energy of the moving door 8 the energy storage device is charged.

The overhead door operator system may comprise a transmission mounting arrangement, not shown. The transmission mounting arrangement is for attaching the elongated transmission member 19.

Figure 4:
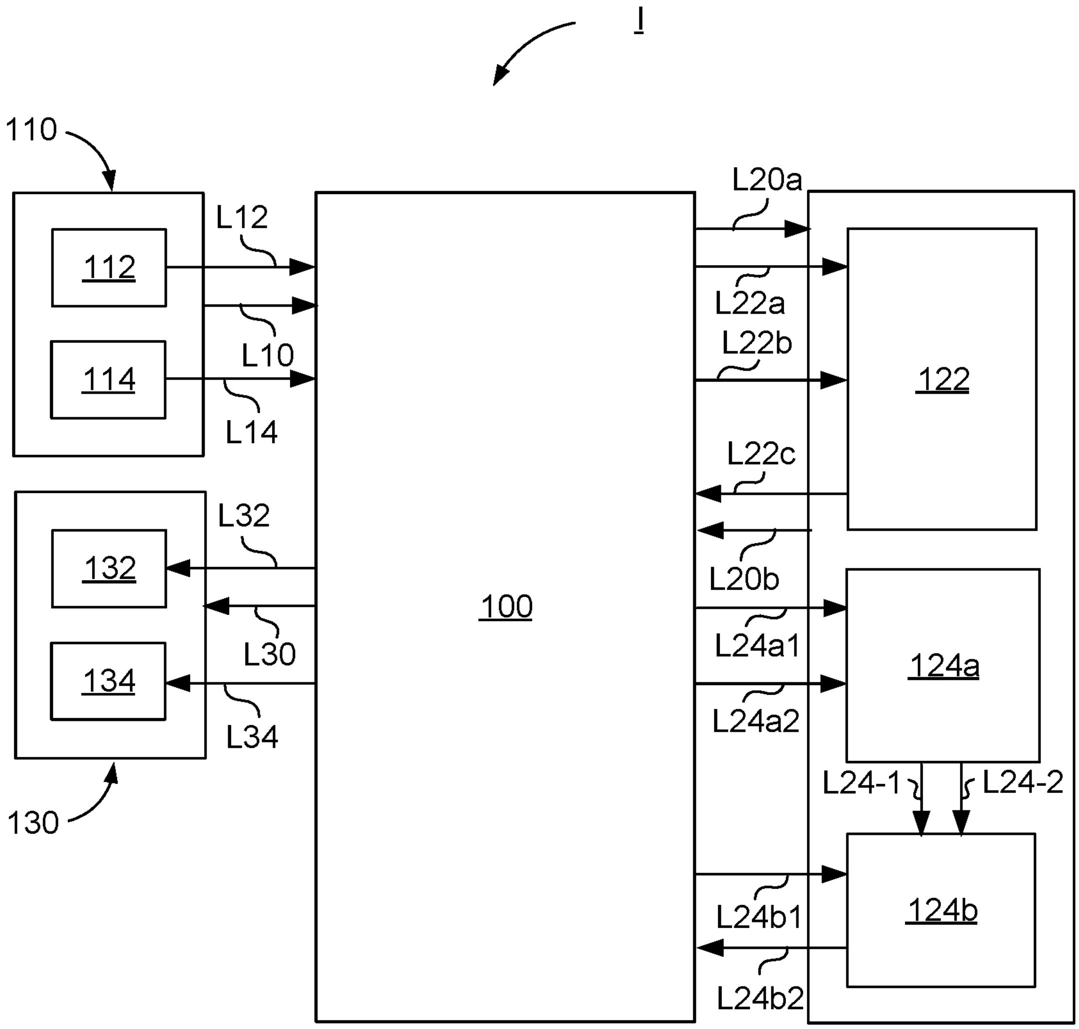
FIG. 4 discloses a schematic block diagram of a control unit controlled overhead door operator system for opening and closing an opening according to an aspect of the present disclosure.

FIG. 4 discloses a schematic block diagram of a control device controlled overhead door operator system I for opening and closing an opening according to an aspect of the present disclosure. The overhead door operator system may be any suitable overhead door operator system such as an overhead door operator system according to FIGS. 1 and 3.

Herein the term "link" may refer to a communication link which may be a physical connector, such as an optoelectronic communication wire, or a non-physical connector such as a wireless connection, for example a radio or microwave link.

The overhead door operator system comprises a control device 100 for controlling the overhead door operator system.

The overhead door operator system comprises a door frame comprising a first frame section at a first side of the opening and a second frame section at a second side of the opening opposite the first side. The overhead door operator system further comprises a door arranged to be moved between an open and closed position, the door being movably connected to the door frame. The overhead door operator system further comprises; a drive unit mounted on the door, the drive unit comprising at least one motor arranged to move the door from the closed position to the open position; and a first elongated transmission member extending along the first side of the opening and the first frame section, whereby the drive unit further comprises a first driven transmission member in driving connection with the motor. The first driven transmission member is movably connected to the first elongated transmission member and arranged to interplay with said first elongated transmission member for driving the first driven transmission member along said first elongated transmission member by means of the first elongated transmission member so as to move the door between the closed and open position.

According to this aspect of the present disclosure, the drive unit may further comprise a second elongated transmission member extending along the second side of the opening and the second frame section whereby the drive unit further comprises a second driven transmission member arranged to interplay with the second elongated transmission member by means of the second elongated transmission member. The drive unit comprises a motor being in driving connection with the second driven transmission member. The drive unit of the overhead door operator system may according to an aspect of the present disclosure have a motor which is in driving connection with both the first driven transmission member and the second driven transmission member. The drive unit of the overhead door operator system may according to another aspect of the present disclosure comprise a first motor being in driving connection with the first driven transmission member and a second motor being in driving connection with the second driven transmission member.

The control device 100 may be implemented as a separate entity or distributed in two or more physical entities. The control device 100 may comprise one or more computers. The control device 100 may thus be implemented or realized by the control device comprising a processor and a memory, the memory comprising instructions, which when executed by the processor causes the control device to perform the herein disclosed method.

The control device 100 may comprise one or more control units. The control device 100 may comprise two or more separate control units, but operably connected to each other. The control device 100 may be comprised in or operably connected to the drive unit of the overhead door operator system.

The control device 100 is configured to receive one or more signals from detection associated with movement of the door. The control device 100 is configured to receive one or more signals from a detection device 110 for detecting movement of the door of the overhead door operator system I. The overhead door operator system I may comprise or be operably connectable to the detection device 110. The detection device 110 for detecting movement of the door of the overhead door operator system I may be arranged in connection to the door so as to detect door movement. The control device 100 may be operably connected to the detection device 110 via a link L10. The control device 100 may, via said link L10, be arranged to receive one or more signals from detection associated with movement of the door.

According to an aspect of the present disclosure, the control device 100 may, when receiving one or more signals from detection associated with movement of the door, be configured to receive acceleration signals and/or vibration signals from detection of movement of the door by means of one or more acceleration sensors arranged in connection to the door.

According to an aspect of the present disclosure, the detection device 110 comprises one or more acceleration detection units 112. The acceleration detection units may comprise one or more accelerometers. The overhead door operator system I may comprise or be operably connectable to the one or more acceleration detection units 112. The one or more acceleration detection units 112 may be arranged in connection to the door so as to detect door movement. As shown in FIG. 3*b*, the one or more acceleration detection units 112 may comprise one or more acceleration detection units 112*a* arranged at the door in connection to the first side 7 so as to detect door movement in connection to that side, and one or more acceleration detection units 112*b* arranged at the door in connection to the opposite second side 5 so as to detect door movement in connection to that side. According to an aspect of the present disclosure, the detection device 110 comprises one or more vibration detection units.

The control device 100 may be operably connected to the one or more acceleration detection units 112 via one or more links L12. The control device 100 may, via said one or more links L12, be arranged to receive one or more acceleration signals and/or vibration signals from detection of movement of the door.

According to an aspect of the present disclosure, the control device 100 may, when receiving one or more signals from detection associated with movement of the door, be configured to receive torque signals from detection of torque of the at least one motor of the door by means of torque sensor arranged in connection to the at least one motor.

According to an aspect of the present disclosure, the detection device 110 comprises one or more torque detection units 114 for detecting torque of the at least one motor of the drive unit. The overhead door operator system I may comprise or be operably connectable to the one or more torque detection units 114. As shown in FIG. 3*b*, for an overhead door operator system having a first motor 11*a* being in driving connection with the first driven transmission member and a second motor 11*b* being in driving connection with the second driven transmission member, the one or more torque detection units 114 may comprise one or more torque detection units 114*a* arranged at the first motor 11*a* so as to detect torque of the first motor arranged in connection to the first side, and one or more torque detection units 114*b* arranged at the second motor 11*b* so as to detect torque of the second motor arranged in connection to the opposite second side.

The control device 100 may be operably connected to the one or more torque detection units 114 via one or more links L14. The control device 100 may, via said one or more links L14, be arranged to receive one or more torque signals from detection of torque of the at least one motor of the drive unit.

The detection device 110 may comprise one or more acceleration detection units 112 and/or vibration detection units and/or one or more torque detection units 114.

The control device 100 is configured to determine whether or not the thus detected door movement is related to an unexpected door movement based on the thus received one or more signals from detection associated with movement of the door.

The overhead door operator system I may comprise or be operably connectable to a door movement characteristics determination device 120 for determining if detected door movement is related to an unexpected door movement. The control device 100 may comprise and/or be operably connectable to the door movement characteristics determination device 120.

The control device 100 may be operably connected to the door movement characteristics determination device 120 via a link L20*a*. The control device 100 may, via said link L20*a*, be arranged to send one or more signals from detection associated with door movement.

The control device 100 may be operably connected to the door movement characteristics determination device 120 via a link L20*b*. The control device 100 may, via said link L20*b*, be arranged to receive one or more signals from the door movement characteristics determination device 120 representing data for unexpected door movement.

According to an aspect of the present disclosure, the control device 100 is configured to determine whether or not the thus detected door movement is related to an unexpected door movement based on the thus received signals from detection associated with movement of the door in connection to the first side and the one or more signals from detection associated with movement of the door in connection to the second side. According to an aspect of the present disclosure, the control device 100 is configured to compare the signals associated with door movement in connection to the first side with the signals associated with door movement in connection the second side, and determine that the thus detected door movement is related to an unexpected door movement if the difference of door movement in connection to the first side compared with door movement in connection the second side exceeds a certain threshold.

According to an aspect of the present disclosure, the door movement characteristics determination device 120 comprises a side door movement comparison device 122 for comparing the signals associated with door movement in connection to the first side with the signals associated with door movement in connection the second side. The side door movement comparison device 122 may be comprised in or operably connected to the control device 100.

The control device 100 may be operably connected to the side door movement comparison device 122 via a link L22*a*. The control device 100 may, via said link L22*a*, be arranged to send one or more signals from detection associated with door movement at the first side.

The control device 100 may be operably connected to the side door movement comparison device 122 via a link L22*b*. The control device 100 may, via said link L22*b*, be arranged to send one or more signals from detection associated with door movement at the second side.

The control device 100 may be operably connected to the side door movement comparison device 122 via a link L22*c*. The control device 100 may, via said link L22*c*, be arranged to receive one or more signals from the side door movement comparison device 122 representing data for unexpected door movement.

According to an aspect of the present disclosure, the control device 100 is configured to store information from the detection associated with opening and closing movement of the door during normal operation. According to an aspect of the present disclosure, the control device 100 may also be configured to store information from detection associated with door movement on the respective side. According to an aspect of the present disclosure, the control device 100 may also be configured to store information from detection associated with unexpected door movement. According to an aspect of the present disclosure, the control device 100 may, when storing information from detection associated with unexpected door movement, be configured to store type of unexpected door movement, i.e. the cause of the unexpected door movement. The cause of an unexpected door movement may e.g. be a broken transmission member, e.g. chain, or a direct impact on the door by a vehicle or the like.

According to an aspect of the present disclosure, the door movement characteristics determination device 120 comprises a storage device 124*a*. The storage device 124*a* is according to an aspect configured for storing signals associated with opening and closing movement of the door during normal operation. The storage device 124*a* may according to an aspect further be configured for storing signals associated with unexpected door movement. The storage device 124*a* may be comprised in or operably connected to the control device 100.

The control device 100 may be operably connected to the storage device 124*a* via a link L24*a*1. The control device 100 may, via said link L24*a*1, be arranged to send signals associated with opening and closing movement of the door during normal operation, which are stored in the storage device 124*a*.

The control device 100 may be operably connected to the storage device 124*a* via a link L24*a*2. The control device 100 may, via said link L24*a*2, be arranged to send signals associated with unexpected door movement, which are stored in the storage device 124*a*.

According to an aspect of the present disclosure, the control device 100 is configured to determine whether or not the thus detected door movement is related to an unexpected door movement based on the thus stored information from the detection associated with opening and closing movement of the door during normal operation. According to an aspect of the present disclosure, the control device 100 is configured to compare the signals associated with door movement with the thus stored information from the detection associated with opening and closing movement of the door during normal operation, and that the thus detected door movement is related to an unexpected door movement if the difference between detected door movement compared with the thus stored information of door movement during normal operation exceeds a certain threshold. According to an aspect of the present disclosure, the control device 100 may be configured to compare the signals associated with door movement with the thus stored information from the detection associated with unexpected door movement, and determine that the thus detected door movement is related to an unexpected door movement if the detected door movement essentially coincides with the thus stored information of unexpected door movement.

According to an aspect of the present disclosure, the door movement characteristics determination device 120 comprises a stored door movement comparison device 124*b* for comparing the signals associated with door movement with the thus stored information. The stored door movement comparison device 124*b* may be configured to compare the signals associated with door movement with the thus stored information from the detection associated with opening and closing movement of the door during normal operation. The stored door movement comparison device 124*b* may be configured to compare the signals associated with door movement with the stored information about unexpected door movement. The stored door movement comparison device 124*b* may be comprised in or operably connected to the control device 100.

The storage device 124*a* may be operably connected to the stored door movement comparison device 124*b* via a link L24-1. The stored door movement comparison device 124*b* may, via said link L24*a*1, be arranged to receive signals associated with data of stored opening and closing movement of the door during normal operation.

The storage device 124*a* may be operably connected to the stored door movement comparison device 124*b* via a link L24-2. The stored door movement comparison device 124*b* may, via said link L24*a*1, be arranged to receive signals associated with data of stored unexpected door movement.

The control device 100 may be operably connected to the stored door movement comparison device 124*b* via a link L24*b*1. The control device 100 may, via said link L24*b*1, be arranged to send signals from detection associated with movement of the door.

The control device 100 may be operably connected to stored door movement comparison device 124*b* via a link L24*a*2. The control device 100 may, via said link L24*a*2, be arranged to receive signals based on comparison as a basis for determining whether or not the thus detected door movement is related to an unexpected door movement.

If it is determined that detected door movement is related to an unexpected door movement, the control device 100 is configured to take action so as to prevent more extensive damages.

The overhead door operator system I may comprise or be operably connectable to a damage prevention device 130 for taking action so as to prevent more extensive damages in connection to detection of unexpected door movement. The control device 100 may comprise and/or be operably connectable to the damage prevention device 130. The damage prevention device 130 may be comprised in the drive unit.

The control device 100 may be operably connected to the damage prevention device 130 via a link L30. The control device 100 may, via said link L30, be arranged to send signals to the damage prevention device 130 so as to activate the damage prevention device for preventing more extensive damages due to a determined unexpected door movement.

According to an aspect of the present disclosure, the control device 100 is configured to activate a brake function for preventing uncontrolled movement of the door. The damage prevention device 130 may comprise at least one brake member 132. According to an aspect of the present disclosure, the control device, when activating a brake function for preventing uncontrolled movement of the door, is configured to activate the at least one brake member 132 so as to provide a brake force by means of the at last one brake member against the first side and/or the second side so as to prevent movement of the door. The at least one brake member 132 may be comprised in the drive unit. The at least one brake member 132 may be arranged in any suitable way in connection to the overhead door operator system I. The at least one brake member 132 may according to an aspect of the present disclosure be arranged in connection to the at least one motor of the drive unit and configured to activate in connection to deactivation of the motor.

For an overhead door operator system having a first motor being in driving connection with the first driven transmission member and a second motor being in driving connection with the second driven transmission member, the damage prevention device 130 may comprise a first brake member 132 arranged in connection to the first motor and a second brake member 132 arranged in connection to the second motor. Hereby the first brake member will be activated by providing a brake force against the first driven transmission member if an unexpected door movement associated with a damaged/broken second driven transmission member is determined, and vice versa.

According to an aspect of the present disclosure, the at least one brake member 132 may be arranged in connection to the door and be configured to provide a brake force against the first frame section and/or the second frame section of the door frame.

The control device 100 may be operably connected to the at least one brake member 132 via one or more links L32. The control device 100 may, via said one or more links L32, be arranged to send signals to the at least one brake member 132 so as to activate the at least one brake member 132 for activating a brake function for preventing uncontrolled movement of the door.

According to an aspect of the present disclosure, the control device 100 is configured to prevent operation of the door operator system associated with opening and closing the opening. The damage prevention device 130 may comprise an operation prevention device 134 for preventing operation of the door operator system associated with opening and closing the opening. The control device 100 may comprise and/or be operably connectable to the operation prevention device 134. The operation prevention device 134 may be comprised in the drive unit.

The control device 100 may be operably connected to the operation prevention device 134 via a link L34. The control device 100 may, via said link L34, be arranged to send signals to the operation prevention device 134 so as to activate the prevention device 134 for preventing operation of the door operator system associated with opening and closing the opening.

The control device 100 is according to an embodiment, adapted to perform the method M1 described below with reference to FIG. 9. The control device 100 is according to an embodiment, adapted to perform the method M2 described below with reference to FIG. 10. The control device 100 is according to an embodiment, adapted to perform the method M3 described below with reference to FIG. 11. The control device 100 is according to an embodiment, adapted to perform the method M4 described below with reference to FIG. 12.

FIG. 5-9 show schematic flowcharts of a method M1; M2, M3; M4 and M5, for controlling an overhead door operator system for opening and closing an opening according to an aspect of the present disclosure. The methods may be performed by means of a control device, e.g. a control device 100 as described with reference to FIG. 4. The methods may be combined in any suitable manner.

The overhead door operator system comprises: a door frame comprising a first frame section at a first side of the opening and a second frame section at a second side of the opening opposite the first side. The overhead door operator system further comprises a door arranged to be moved between an open and closed position, the door being movably connected to the door frame. The overhead door operator system further comprises; a drive unit mounted on the door, the drive unit comprising at least one motor arranged to move the door from the closed position to the open position; and a first elongated transmission member extending along the first side of the opening and the first frame section, whereby the drive unit further comprises a first driven transmission member in driving connection with the motor. The first driven transmission member is movably connected to the first elongated transmission member and arranged to interplay with said first elongated transmission member for driving the first driven transmission member along said first elongated transmission member by means of the first elongated transmission member so as to move the door between the closed and open position.

Figure 5:
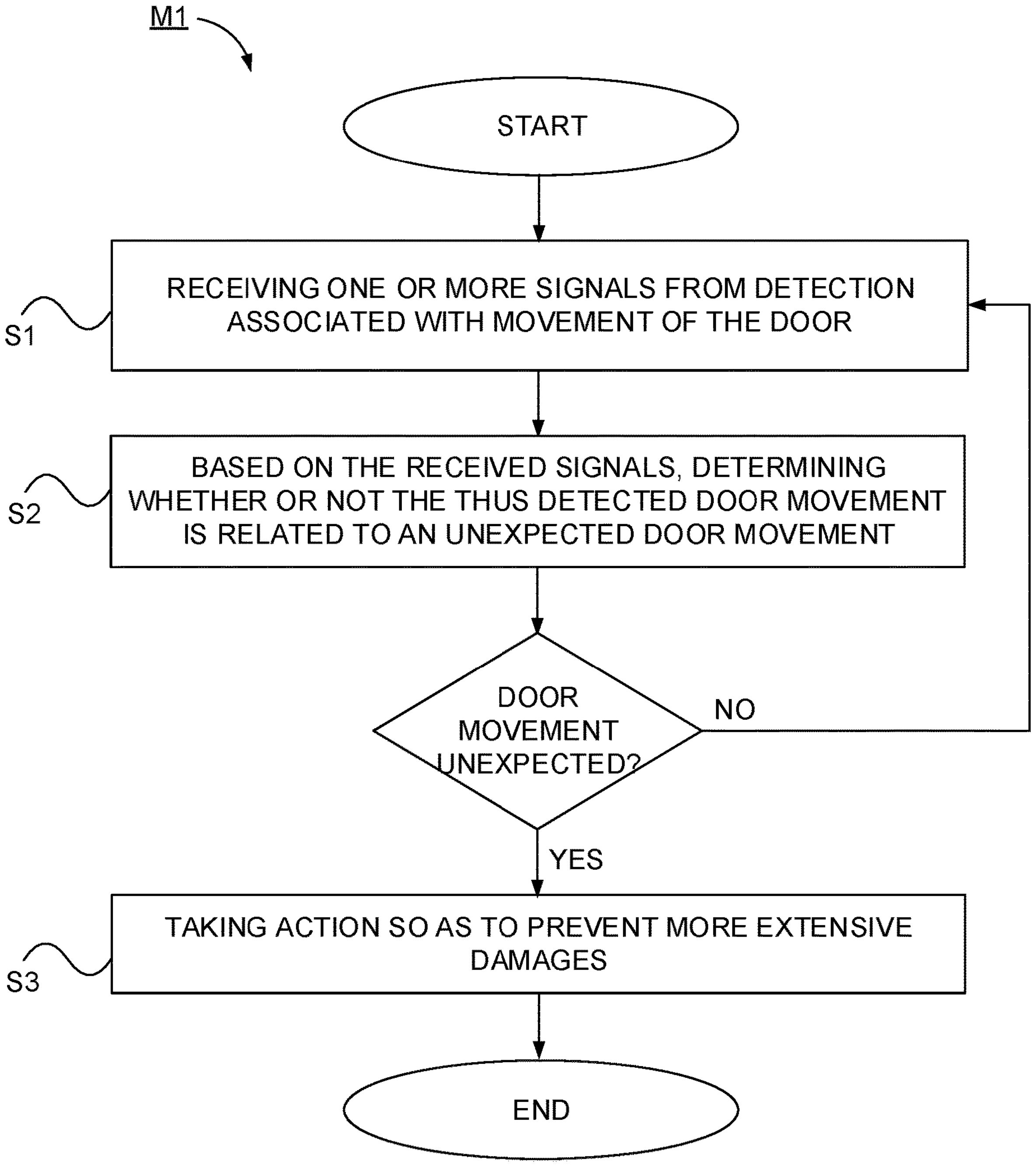
FIG. 5 shows a schematic flowchart of a method for controlling an overhead door operator system for opening and closing an opening according to an aspect of the present disclosure.

FIG. 5 shows a schematic flowchart of a method M1 for controlling an overhead door operator system for opening and closing an opening according to an aspect of the present disclosure.

According to an aspect of the present disclosure the method M1 comprises a step S1. In this step one or more signals are received from detection associated with movement of the door.

According to an aspect of the present disclosure the method M1 comprises a step S2. In this step it is determined, based on the received signals, whether or not the thus detected door movement is related to an unexpected door movement. Unexpected door movement may be associated with a damaged/broken elongated transmission member and/or damaged/broken driven transmission member. Unexpected door movement may be associated with a direct impact on the door, e.g. by a vehicle or the like.

According to an aspect of the present disclosure the method M1 comprises a step S3. In this step, if it is determined that detected door movement is related to an unexpected door movement, action is taken so as to prevent more extensive damages.

Figure 6:
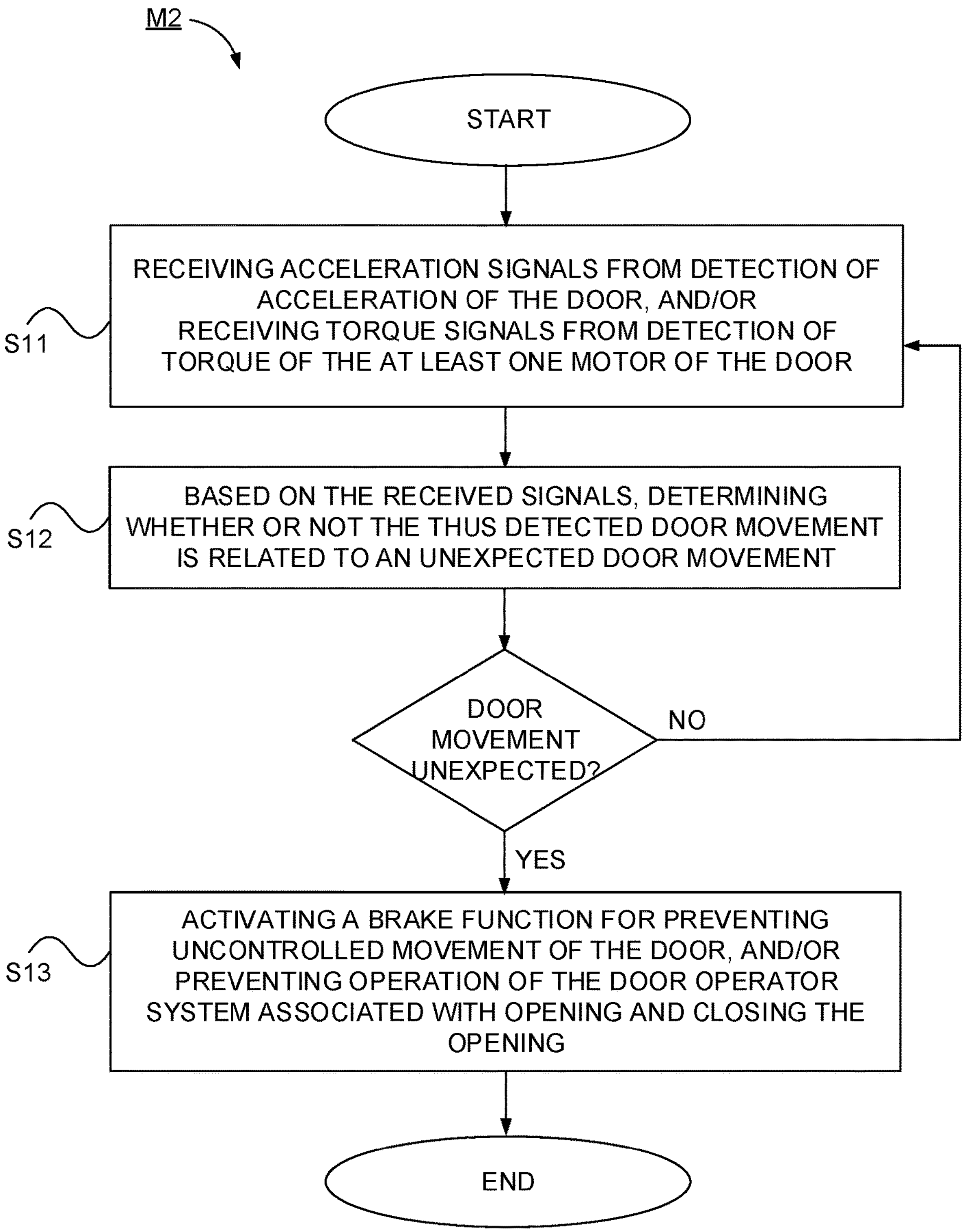
FIG. 6 shows a schematic flowchart of a method for controlling an overhead door operator system for opening and closing an opening according to an aspect of the present disclosure.

FIG. 6 shows a schematic flowchart of a method M2 for controlling an overhead door operator system for opening and closing an opening according to an aspect of the present disclosure.

According to an aspect of the present disclosure the method M2 comprises a step S11. In this step one or more acceleration signals and/or vibration signals are received from detection associated with movement of the door, and/or one or more torque signals are received from detection of torque of the at least one motor of the door. Acceleration movement of the door may be detected by means of any suitable acceleration detection unit arranged in connection to the door. The acceleration detection unit may comprise one or more accelerometers. Torque of the at least one motor may be detected by means of one or more torque detection units. The one or more torque detection units may comprise one or more torque detection units arranged at each of the at least one motor.

According to an aspect of the present disclosure the method M2 comprises a step S12. In this step it is determined, based on the received signals, whether or not the thus detected door movement is related to an unexpected door movement.

Unexpected door movement may be associated with a damaged/broken elongated transmission member and/or damaged/broken driven transmission member. Unexpected door movement may be associated with a direct impact on the door, e.g. by a vehicle or the like.

According to an aspect of the present disclosure the method M2 comprises a step S13. In this step, if it is determined that detected door movement is related to an unexpected door movement, a brake function for preventing uncontrolled movement of the door is activated and/or operation of the overhead door operator system associated with opening and closing the opening is prevented.

Figure 7:
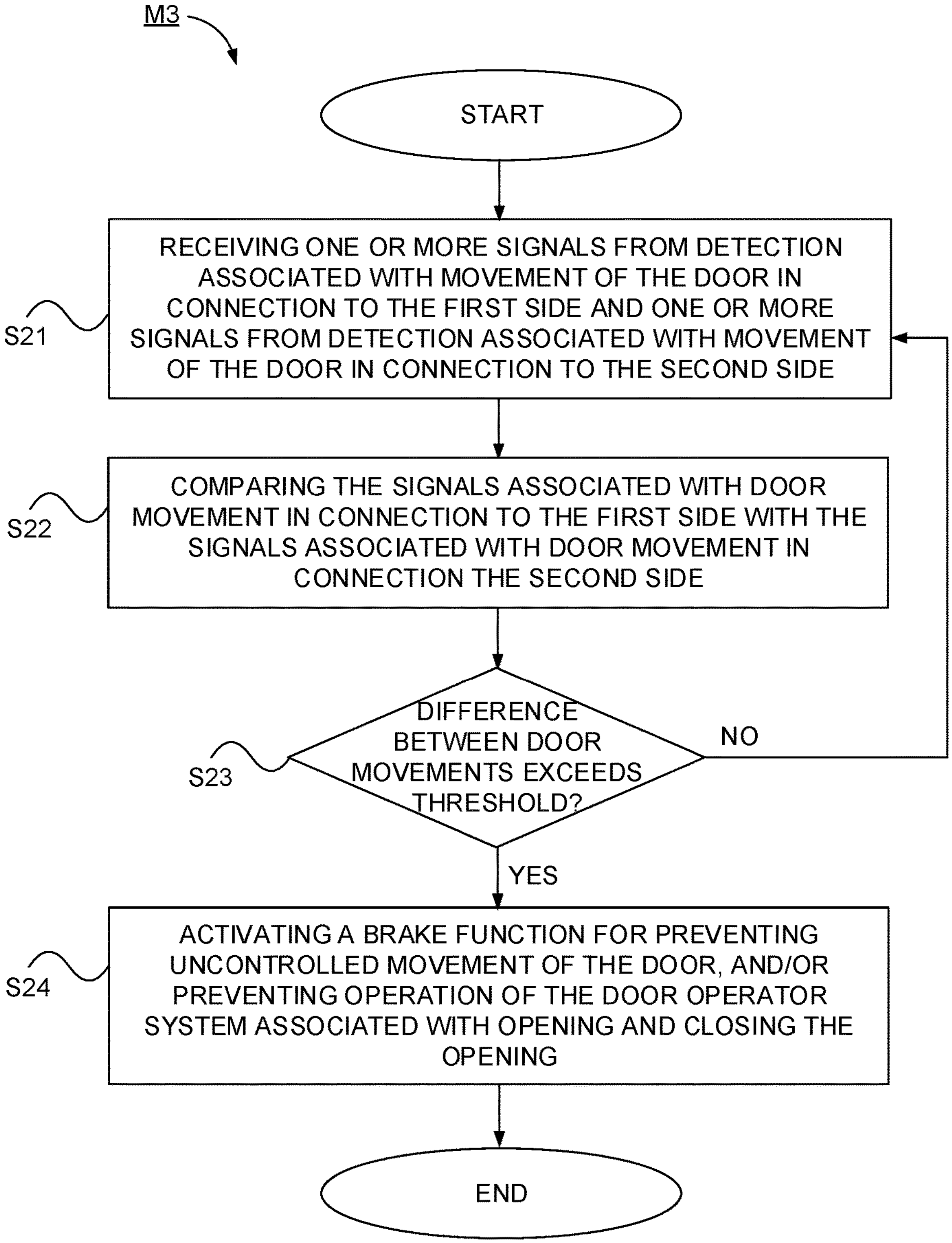
FIG. 7 shows a schematic flowchart of a method for controlling an overhead door operator system for opening and closing an opening according to an aspect of the present disclosure.

FIG. 7 shows a schematic flowchart of a method M3 for controlling an overhead door operator system for opening and closing an opening according to an aspect of the present disclosure.

According to this aspect of the present disclosure, the drive unit further comprises a second elongated transmission member extending along the second side of the opening and the second frame section whereby the drive unit further comprises a second driven transmission member arranged to interplay with the second elongated transmission member by means of the second elongated transmission member. The drive unit comprises a motor being in driving connection with the second driven transmission member. The drive unit of the overhead door operator system may according to an aspect of the present disclosure have a motor which is in driving connection with both the first driven transmission member and the second driven transmission member. The drive unit of the overhead door operator system may according to another aspect of the present disclosure comprise a first motor being in driving connection with the first driven transmission member and a second motor being in driving connection with the second driven transmission member, wherein the step of receiving one or more signals from detection associated with movement of the door comprises.

According to an aspect of the present disclosure the method M3 comprises a step S21. In this step one or more signals are received from detection associated with movement of the door in connection to the first side and one or more signals are received from detection associated with movement of the door in connection to the second side.

According to an aspect of the present disclosure the method M3 comprises a step S22. In this step the signals associated with door movement in connection to the first side are compared with the signals associated with door movement in connection the second side.

According to an aspect of the present disclosure the method M3 comprises a step S22. In this step it is determined that the thus detected door movement is related to an unexpected door movement if the difference of door movement in connection to the first side compared with door movement in connection the second side exceeds a certain threshold.

Unexpected door movement may be associated with a damaged/broken elongated transmission member and/or damaged/broken driven transmission member.

According to an aspect of the present disclosure the method M3 comprises a step S24. In this step, if it is determined that detected door movement is related to an unexpected door movement, a brake function for preventing uncontrolled movement of the door is activated and/or operation of the overhead door operator system associated with opening and closing the opening is prevented.

Figure 8:
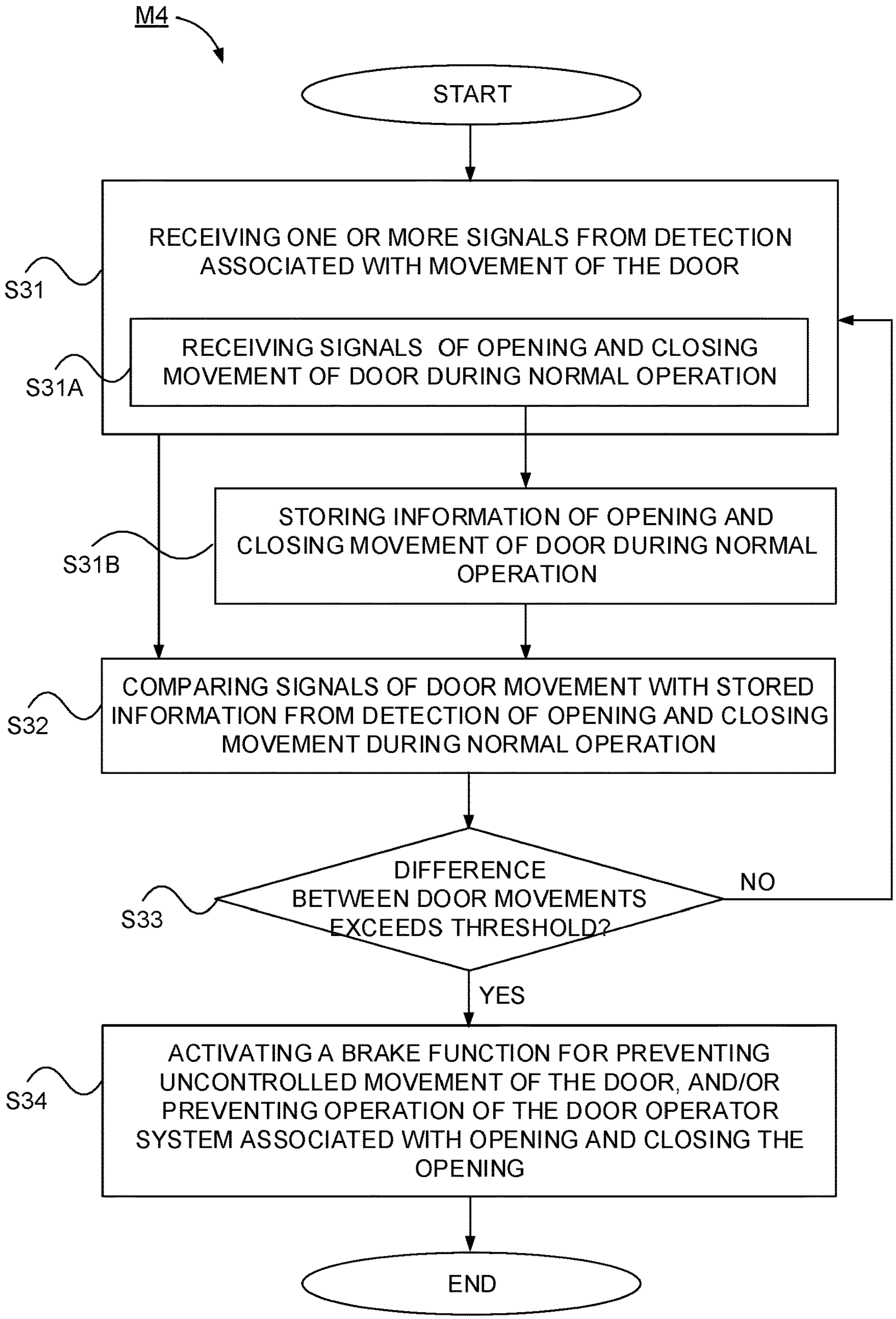
FIG. 8 shows a schematic flowchart of a method for controlling an overhead door operator system for opening and closing an opening according to an aspect of the present disclosure.

FIG. 8 shows a schematic flowchart of a method M4 for controlling an overhead door operator system for opening and closing an opening according to an aspect of the present disclosure.

According to an aspect of the present disclosure the method M4 comprises a step S31A. In this step one or more signals are received from detection associated with opening and closing movement of the door during normal operation.

According to an aspect of the present disclosure the method M4 comprises a step S31B. In this step information from the detection associated with opening and closing movement of the door during normal operation is stored.

According to an aspect of the present disclosure the method M4 comprises a step S31. In this step one or more signals are received from detection associated with movement of the door.

According to an aspect of the present disclosure the method M4 comprises a step S32. In this step the signals associated with door movement are compared with the thus stored information from the detection associated with opening and closing movement of the door during normal operation.

According to an aspect of the present disclosure the method M4 comprises a step S33. In this step it is determined that the thus detected door movement is related to an unexpected door movement if the difference between detected door movement compared with the thus stored information of door movement during normal operation exceeds a certain threshold.

Unexpected door movement may be associated with a damaged/broken elongated transmission member and/or damaged/broken driven transmission member. Unexpected door movement may be associated with a direct impact on the door, e.g. by a vehicle or the like.

According to an aspect of the present disclosure the method M4 comprises a step S34. In this step, if it is determined that detected door movement is related to an unexpected door movement, a brake function for preventing uncontrolled movement of the door is activated and/or operation of the overhead door operator system associated with opening and closing the opening is prevented.

According to an aspect of the present disclosure the method M4 may comprise a step in which one or more signals are received from detection associated with unexpected movement of the door, and a step in which information from the detection associated with unexpected movement of the door is stored. In a further step, the signals associated with door movement are compared with the thus stored information from the detection associated with unexpected movement. In a further step it is then determined that the thus detected door movement is related to an unexpected door movement if the detected door movement essentially corresponds with the thus stored information of unexpected door movement.

Figure 9:
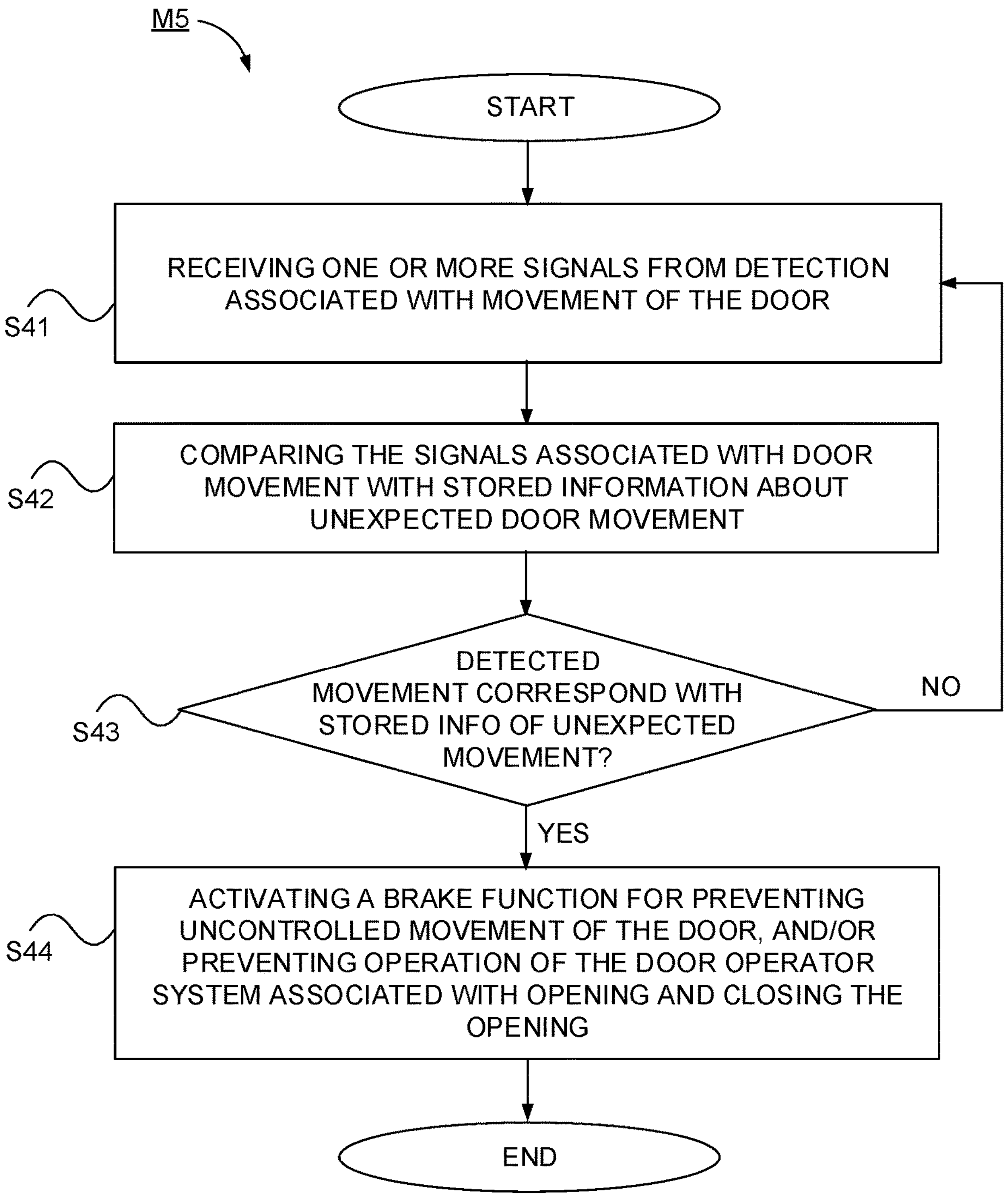
FIG. 9 shows a schematic flowchart of a method for controlling an overhead door operator system for opening and closing an opening according to an aspect of the present disclosure.

FIG. 9 shows a schematic flowchart of a method M5 for controlling an overhead door operator system for opening and closing an opening according to an aspect of the present disclosure.

According to an aspect of the present disclosure the method M5 comprises a step S41. In this step one or more signals are received from detection associated with movement of the door.

According to an aspect of the present disclosure the method M5 comprises a step S42. In this step the signals associated with door movement are compared with stored information about unexpected door movement. The stored information about unexpected door movement may comprise information about different types of unexpected door movements and probable cause for the respective type.

According to an aspect of the present disclosure the method M5 comprises a step S43. In this step it is determined that the thus detected door movement is related to an unexpected door movement if the detected door movement essentially correspond with stored information of unexpected door movement. The step of determining that the thus detected door movement is related to an unexpected door movement if the detected door movement essentially corresponds with thus stored information of unexpected door movement may comprise determining type of the determined unexpected door movement and thereby probable cause for the unexpected door movement.

Unexpected door movement may be associated with a damaged/broken elongated transmission member and/or damaged/broken driven transmission member. Unexpected door movement may be associated with a direct impact on the door, e.g. by a vehicle or the like.

According to an aspect of the present disclosure the method M5 comprises a step S34. In this step, if it is determined that detected door movement is related to an unexpected door movement, a brake function for preventing uncontrolled movement of the door is activated and/or operation of the overhead door operator system associated with opening and closing the opening is prevented.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

The invention claimed is:

1. A method at a control device for controlling an overhead door operator system, the overhead door operator system being configured for opening and closing an opening, the overhead door operator system comprising:

a door frame comprising a first frame section at a first side of the opening and a second frame section at a second side of the opening opposite the first side;

a door arranged to be moved between an open (O) and closed (C) position, the door being movably connected to the door frame;

a drive unit mounted on the door, the drive unit comprising at least one motor arranged to move the door from the closed position (C) to the open position;

a first detection unit arranged at the door in connection to the first side to detect door movement in connection with the first side;

a second detection unit arranged at the door in connection to the second side so as to detect door movement in connection to the second side;

a first elongated transmission member extending along the first side of the opening and the first frame section; and a second elongated transmission member extending along the second side of the opening and the second frame section, wherein the drive unit further comprises a first driven transmission member in driving connection with the motor, the first driven transmission member being movably connected to the first elongated transmission member and arranged to interplay with said first elongated transmission member for driving the first driven transmission member along said first elongated transmission member by means of the first elongated transmission member and wherein the drive unit further comprises a second driven transmission member in driving connection with the motor and arranged to interplay with the second elongated transmission member, so as to move the door between the closed (C) and open (O) position, the method comprising the steps of:

receiving one or more first signals from the first detection unit associated with movement of the door in connection to the first side and one or more second signals from the second detection unit associated with movement of the door in connection to the second side;

comparing the first signals associated with door movement in connection to the first side with the second signals associated with door movement in connection the second side, determining whether or not the thus detected door movement is related to an unexpected door movement if a difference between the first and second signals exceeds a certain threshold; and if it is determined that detected door movement is related to an unexpected door movement, taking action so as to prevent more extensive damages.

2. The method according to claim 1, wherein the step of taking action comprises activating a brake function for preventing uncontrolled movement of the door.

3. The method according to claim 2, wherein the drive unit comprises at least one brake member, wherein the step of activating a brake function for preventing uncontrolled movement of the door comprises providing a brake force by means of the at least one brake member against the first side and/or the second side so as to prevent movement of the door.

4. The method according to claim 2, wherein the drive unit comprises a first motor being in driving connection with the first driven transmission member and a second motor being in driving connection with the second driven transmission member, wherein the step of activating a brake function for preventing uncontrolled movement of the door comprises braking by means of the motor being in driving connection with the driven transmission member for which elongated transmission member and driven transmission member are still functioning.

5. The method according to claim 1, wherein the step of taking action comprises preventing operation of the door operator system associated with opening and closing the opening.

6. The method according to claim 1, wherein the first and second detection units comprise acceleration detection or vibration detection units, and wherein the step of receiving one or more first and second signals from the first and second detection units comprises receiving acceleration signals and/or vibration signal.

7. The method according to claim 1, wherein the first and second detection units comprise torque detection units, and wherein the step of receiving one or more first and second signals from the first and second detection units comprises receiving torque signals from detection of torque of the at least one motor-of the door.

8. The method according to claim 1, wherein the step of determining whether or not the thus detected door movement is related to an unexpected door movement comprises:

comparing the first and second signals associated with door movement with stored information about unexpected door movement; and determining that the thus detected door movement is related to an unexpected door movement if the detected door movement essentially corresponds with thus stored information of unexpected door movement.

9. The method according to claim 8, wherein the stored information about unexpected door movement comprises information about different types of unexpected door movements and probable cause for the respective type, wherein the step of determining that the thus detected door movement is related to an unexpected door movement if the detected door movement essentially corresponds with thus stored information of unexpected door movement comprises:

determining type of the determined unexpected door movement and thereby probable cause for the unexpected door movement.

10. A method at a control device for controlling an overhead door operator system, the overhead door operator system being configured for opening and closing an opening, the overhead door operator system comprising:

a door frame comprising a first frame section at a first side of the opening and a second frame section at a second side of the opening opposite the first side;

a door arranged to be moved between an open (O) and closed (C) position, the door being movably connected to the door frame;

a drive unit mounted on the door, the drive unit comprising at least one motor arranged to move the door from the closed position (C) to the open position;

a first detection unit arranged at the door in connection to the first side to detect door movement in connection with the first side;

a second detection unit arranged at the door in connection to the second side so as to detect door movement in connection to the second side;

a first elongated transmission member extending along the first side of the opening and the first frame section; and a second elongated transmission member extending along the second side of the opening and the second frame section, wherein the drive unit further comprises a first driven transmission member in driving connection with the motor, the first driven transmission member being movably connected to the first elongated transmission member and arranged to interplay with said first elongated transmission member for driving the first driven transmission member along said first elongated transmission member by means of the first elongated transmission member and wherein the drive unit further comprises a second driven transmission member in driving connection with the motor and arranged to interplay with the second elongated transmission member, so as to move the door between the closed (C) and open (O) position, the method comprising the steps of:

receiving one or more first and second signals from the first and second detection units associated with opening and closing movement of the door during normal operation;

storing information from the first and second detection units associated with opening and closing movement of the door during normal operation;

receiving one or more first signals from the first detection unit associated with movement of the door in connection to the first side and one or more second signals from the second detection unit associated with movement of the door in connection to the second side during a subsequent operation;

comparing the first and second signals associated with door movement during the subsequent operation with the thus stored information from the first and second detection units associated with opening and closing movement of the door during normal operation; and determining that the thus detected door movement during the subsequent operation is related to an unexpected door movement if the difference between detected door movement compared with the thus stored information of door movement during normal operation exceeds a certain threshold.

11. An overhead door operator system for opening and closing an opening, the overhead door operator system comprising a control device for controlling the overhead door operator system, the overhead door operator system comprising:

a door frame comprising a first frame section at a first side of the opening and a second frame section at a second side of the opening opposite the first side;

a door arranged to be moved between an open (O) and closed (C) position, the door-being movably connected to the door frame;

a drive unit mounted on the door, the drive unit comprising at least one motor arranged to move the door from the closed position (C) to the open position;

a first detection unit arranged at the door in connection to the first side to detect door movement in connection with the first side;

a second detection unit arranged at the door in connection to the second side so as to detect door movement in connection to the second side; and a first elongated transmission member extending along the first side of the opening-and the first frame section and a second elongated transmission member extending along the second side of the opening and the second frame section, whereby the drive unit further comprises a first driven transmission member in driving connection with the motor, the first driven transmission member-being movably connected to the first elongated transmission member and arranged to interplay with said first elongated transmission member for driving the first driven transmission member along said first elongated transmission member by means of the first elongated transmission member and a second driven transmission member arranged to interplay with the second elongated transmission member by means of the second elongated transmission member so as to move the door between the closed (C) and open (O) position, the control device being configured to:

receive one or more first signals from the first detection unit associated with movement of the door in connection to the first side and one or more second signals from the second detection unit associated with movement of the door in connection to the second side;

compare the first signals associated with door movement in connection to the first side with the signals associated with door movement in connection the second side; and determine that the thus detected door movement is related to an unexpected door movement if the difference of door movement in connection to the first side compared with door movement in connection the second side exceeds a certain threshold;

if it is determined that detected door movement is related to an unexpected door movement, take action so as to prevent more extensive damages.

12. The overhead door operator system according to claim 11, wherein the control device is configured to activate a brake function for preventing uncontrolled movement of the door.

13. The overhead door operator system according to claim 12, wherein the drive unit comprises at least one brake member, wherein the control device, when activating a brake function for preventing uncontrolled movement of the door, is configured to activate the at least one brake member so as to provide a brake force by means of the at last one brake member against the first side and/or the second side so as to prevent movement of the door.

14. The overhead door operator system according to claim 11, wherein the control device, when taking action, is configured to prevent operation of the door operator system associated with opening and closing the opening.

15. The overhead door operator system according to claim 11, wherein the first and second detection units comprise acceleration detection or vibration detection units, and wherein the control device, when receiving one or more signals from the first and second detection units associated with movement of the door, is configured to receive acceleration signals and/or vibration signals from detection of movement of the door.

16. The overhead door operator system according to claim 11, wherein the first and second detection units comprise torque detection units, and wherein the control device, when receiving one or more signals from the first and second detection units associated with movement of the door, is configured to receive torque signals from detection of torque of the at least one motor of the door.

17. The overhead door operator system according to claim 11, wherein the drive unit comprises a first motor being in driving connection with the first driven transmission member and a second motor being in driving connection with the second driven transmission member, wherein the control device, when activating a brake function for preventing uncontrolled movement of the door is configured to activate a braking function of the motor being in driving connection with the driven transmission member for which elongated transmission member and driven transmission member are still functioning.

18. The overhead door operator system according to claim 11, wherein the control device, when determining whether or not the thus detected door movement is related to an unexpected door movement, is configured to:

compare the signals associated with door movement with stored information about unexpected door movement; and determine that the thus detected door movement is related to an unexpected door movement if the detected door movement essentially corresponds with thus stored information of unexpected door movement.

19. The overhead door operator system according to claim 18, wherein the stored information about unexpected door movement comprises information about different types of unexpected door movements and probable cause for the respective type, wherein the control device, when determining that the thus detected door movement is related to an unexpected door movement if the detected door movement essentially corresponds with thus stored information of unexpected door movement, is configured to:

determine type of the determined unexpected door movement and thereby probable cause for the unexpected door movement.

20. An overhead door operator system for opening and closing an opening, the overhead door operator system comprising a control device for controlling the overhead door operator system, the overhead door operator system comprising:

a door frame comprising a first frame section at a first side of the opening and a second frame section at a second side of the opening opposite the first side;

a door arranged to be moved between an open (O) and closed (C) position, the door-being movably connected to the door frame;

a drive unit mounted on the door, the drive unit comprising at least one motor arranged to move the door from the closed position (C) to the open position;

a first detection unit arranged at the door in connection to the first side to detect door movement in connection with the first side;

a second detection unit arranged at the door in connection to the second side so as to detect door movement in connection to the second side; and a first elongated transmission member extending along the first side of the opening and the first frame section and a second elongated transmission member extending along the second side of the opening and the second frame section, whereby the drive unit further comprises a first driven transmission member in driving connection with the motor, the first driven transmission member-being movably connected to the first elongated transmission member and arranged to interplay with said first elongated transmission member for driving the first driven transmission member along said first elongated transmission member by means of the first elongated transmission member and a second driven transmission member arranged to interplay with the second elongated transmission member by means of the second elongated transmission member so as to move the door between the closed (C) and open (O) position, the control device being configured to:

receive one or more signals from the first and second detection units associated with opening and closing movement of the door during normal operation;

store information from the first and second detection units associated with opening and closing movement of the door during normal operation;

receive one or more first signals from the first detection unit associated with movement of the door in connection to the first side and one or more second signals from the second detection unit associated with movement of the door in connection to the second side during a subsequent operation;

compare the signals associated with door movement during the subsequent operation with the thus stored information from the detection associated with opening and closing movement of the door during normal operation; and determine that the thus detected door movement is related to an unexpected door movement if the difference between detected door movement compared with the thus stored information of door movement during normal operation exceeds a certain threshold.

* * * * *